(12) United States Patent
Liu et al.

(10) Patent No.: US 12,517,355 B2
(45) Date of Patent: Jan. 6, 2026

(54) BACKLIGHT ASSEMBLY AND HEAD-UP DISPLAY SYSTEM

(71) Applicant: Shanghai Tianma Microelectronics Co., Ltd., Shanghai (CN)

(72) Inventors: Yang Liu, Shanghai (CN); Jiandong Wang, Shanghai (CN); Xiongping Li, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/625,349

(22) Filed: Apr. 3, 2024

(65) Prior Publication Data

US 2024/0248303 A1    Jul. 25, 2024

(30) Foreign Application Priority Data

Dec. 7, 2023  (CN) .......................... 202311678608.5

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 6/0056* (2013.01); *G02B 27/0081* (2013.01); *G02B 27/0961* (2013.01); *G02B 27/283* (2013.01); *G02F 1/13355* (2021.01); *G02F 1/133606* (2013.01);
(Continued)

(58) Field of Classification Search
CPC ............ G02B 27/0101; G02B 27/0081; G02B 27/0961; G02B 6/0056; G02B 27/283; G02B 2027/0185; G02F 1/133606; G02F 1/13363; G02F 1/13362; G02F 1/13355; G02F 1/133638; G02F 1/1347; B60K 35/00
See application file for complete search history.

(56) References Cited

U.S. PATENT DOCUMENTS

2012/0170000 A1\* 7/2012 Imaoka ................ G02B 27/283
353/20
2013/0069628 A1\* 3/2013 Konno ................ G02B 27/288
385/12
(Continued)

*Primary Examiner* — Adam R. Giesy
(74) *Attorney, Agent, or Firm* — CHRISTENSEN O'CONNOR JOHNSON KINDNESS PLLC

(57) ABSTRACT

A backlight assembly including a light source, a birefringent component and at least one first dimmer is described. In an embodiment, the birefringent component is configured to divide the light incident on the birefringent component into a first polarized light and a second polarized light. In an embodiment, a vibration direction of the first polarized light is different from a vibration direction of the second polarized light. In an embodiment, the birefringent component includes a first region and a second region. In an embodiment, the first polarized light corresponds to the first region, the second polarized light corresponds to the second region, and the first region and the second region at least partially do not overlap in an emission direction of the light. In an embodiment, the first polarized light propagates along a first direction, the second polarized light propagates along a second direction intersecting with the second direction.

19 Claims, 13 Drawing Sheets

(51) Int. Cl.
*F21V 8/00* (2006.01)
*G02B 27/00* (2006.01)
*G02B 27/09* (2006.01)
*G02B 27/28* (2006.01)
*G02F 1/1335* (2006.01)
*G02F 1/13357* (2006.01)
*G02F 1/13363* (2006.01)
*G02F 1/1347* (2006.01)

(52) U.S. Cl.
CPC ...... *G02F 1/13362* (2013.01); *G02F 1/13363* (2013.01); *G02F 1/133638* (2021.01); *G02F 1/1347* (2013.01); *G02B 2027/0185* (2013.01)

(56) References Cited

U.S. PATENT DOCUMENTS

2018/0088255 A1\* 3/2018 Sakai ................. G02B 27/48
2020/0089061 A1\* 3/2020 Wang ................ G02F 1/133514
2023/0030757 A1\* 2/2023 Hsieh ................ G02B 27/283

\* cited by examiner

BACKLIGHT ASSEMBLY AND HEAD-UP DISPLAY SYSTEM

CROSS-REFERENCE TO RELATED APPLICATIONS

The present application claims priority to Chinese Patent Application No. 202311678608.5, filed on Dec. 7, 2023, the content of which is incorporated herein by reference in its entirety.

TECHNICAL FIELD

The present disclosure relates to the field of display technologies, and, particularly, relates to a backlight assembly and a head-up display system.

BACKGROUND

With the continuous development of display technology, head-up display (HUD) has gradually been applied in the field of transportation, such as cars. A head-up display system can project information, such as, the vehicle's driving speed, fuel consumption, and required navigation information, on the windshield in front of the driver's seat in the form of graphics and/or characters, so that the driver can view the instrument panel the information, such as, the vehicle's speed and fuel consumption, without lowering down his head when driving a car, which can help to improve driving safety.

The optical path of HUD in the related art is relatively simple. For an optical system including a HUD that can simultaneously display two virtual images at a far distance and a near distance, two sets of optical paths are generally built, which is usually achieved by adding an additional backlight assembly. Such implementation results in a high power consumption and produces a lot of heat.

SUMMARY

One aspect of the present disclosure provides a backlight assembly. In an embodiment, the backlight assembly includes a light source configured to emit light; a birefringent component located at a side of the light source, and at least one first dimmer located at a side of the birefringent component away from the light source. In an embodiment, the birefringent component is configured to divide the light incident on the birefringent component into a first polarized light and a second polarized light. In an embodiment, a vibration direction of the first polarized light is different from a vibration direction of the second polarized light. In an embodiment, the birefringent component includes a first region and a second region. In an embodiment, the first polarized light corresponds to the first region, the second polarized light corresponds to the second region. In an embodiment, the first region and the second region at least partially do not overlap in an emission direction of the light. In an embodiment, the first polarized light propagates along a first direction after being emitted from the first dimmer. In an embodiment, the second polarized light propagates along a second direction. The first direction intersects with the second direction.

Another aspect of the present disclosure provides a head-up display system. In an embodiment, the backlight assembly includes a light source configured to emit light; a birefringent component located at a side of the light source, and at least one first dimmer located at a side of the birefringent component away from the light source. In an embodiment, the birefringent component is configured to divide the light incident on the birefringent component into a first polarized light and a second polarized light. In an embodiment, a vibration direction of the first polarized light is different from a vibration direction of the second polarized light. In an embodiment, the birefringent component includes a first region and a second region. In an embodiment, the first polarized light corresponds to the first region, the second polarized light corresponds to the second region. In an embodiment, the first region and the second region at least partially do not overlap in an emission direction of the light. In an embodiment, the first polarized light propagates along a first direction after being emitted from the first dimmer. In an embodiment, the second polarized light propagates along a second direction. The first direction intersects with the second direction. In an embodiment, the backlight assembly is configured to emit a first backlight beam and a second backlight beam, and a polarization direction of a light in the first backlight beam and a polarization direction of a light in the second backlight beam are perpendicular to each other, one of the first backlight beam and the second backlight beam corresponds to the first polarized light, and the other one of the first backlight beam and the second backlight beam corresponds to the second polarized light. In an embodiment, a first image source configured to receive the first backlight beam and emit a first display light. In an embodiment, a second image source configured to receive the second backlight beam and emit a second display light. In an embodiment, an optical element configured to receive and reflect the first display light to form a first virtual image, and configured to receive and reflect the second display light to form a second virtual image.

BRIEF DESCRIPTION OF DRAWINGS

In order to more clearly explain the embodiments of the present disclosure, the drawings used in the description of the embodiments will be briefly described below. The drawings in the following description are some embodiments of the present disclosure. Those skilled in the art can obtain other drawings based on these drawings.

DESCRIPTION OF EMBODIMENTS

The following embodiments are exemplary and only used to explain the present disclosure, rather than limiting the present disclosure.

Figure 1:
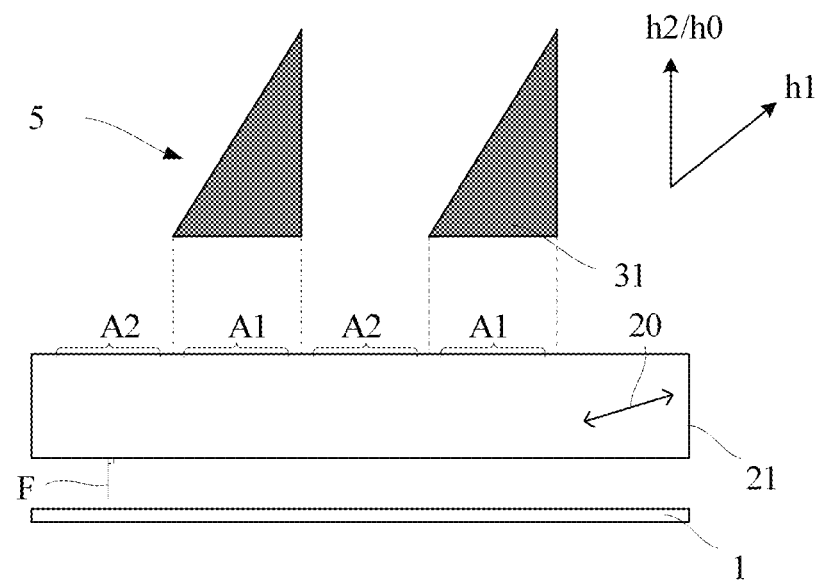
FIG. 1 is a sectional view of a backlight assembly in a first section according to some embodiments of the present disclosure.
Figure 2:
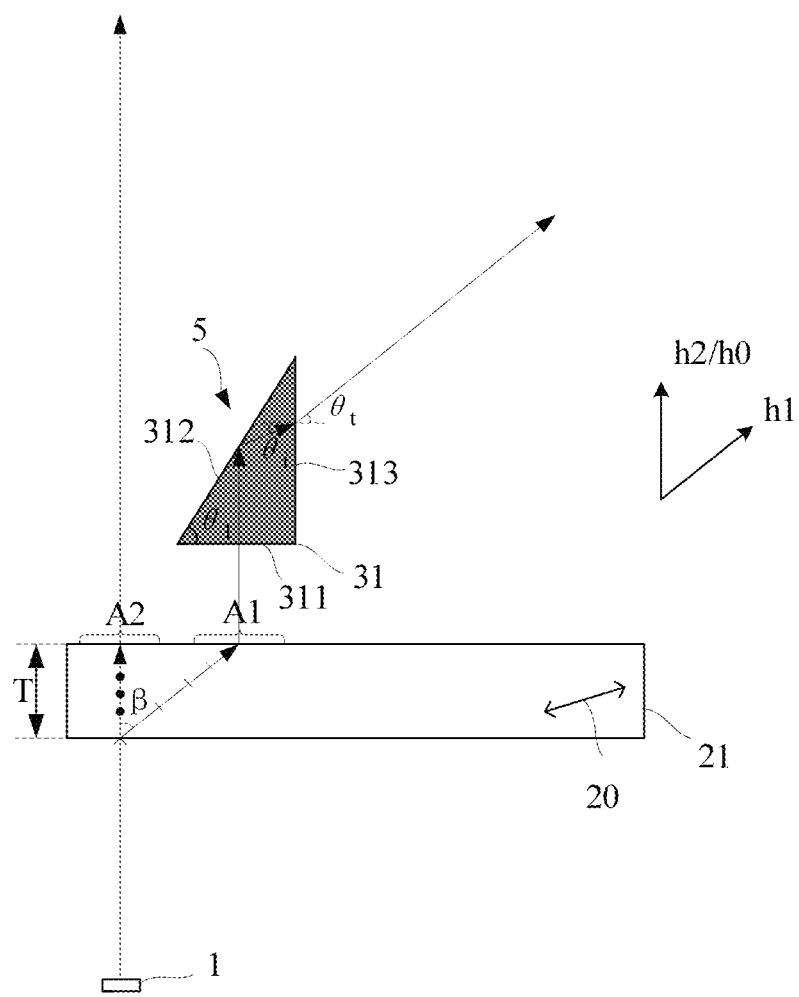
FIG. 2 is a schematic diagram of an optical path shown in FIG. 1 according to some embodiments of the present disclosure.

Some embodiments of the present disclosure provide a backlight assembly. FIG. 1 is a sectional view of a backlight assembly in a first section according to some embodiments of the present disclosure, and FIG. 2 is a sectional view of a backlight assembly shown in FIG. 1. As shown in FIG. 1 and FIG. 2, the backlight assembly includes a light source 1, a birefringent component 21, and a first dimmer 31. The light source 1 is configured to emit light. For example, the light emitted by the light source 1 include natural light.

As shown in FIG. 1, the birefringent component 21 is located at a side of the light source 1. In some embodiments of the present disclosure, the light incident on the birefringent component 21 is divided, in the birefringent component 21, into a first polarized light and a second polarized light whose polarization directions are perpendicular to each other. The first polarized light and the first polarized light propagate along different light propagating directions in the birefringent component 21. As shown in FIG. 1 and FIG. 2, both a normal F of the incident surface of the birefringent component 21 and an optical axis 20 are parallel to the first section. The optical axis 20 of the birefringent component 21 intersects an incident surface of the birefringent component 21. Then, the first polarized light and the second polarized light are emitted from the birefringent component 21.

For example, the first polarized light includes an extraordinary light (e-light) with a vibration direction parallel to the first section, and the second polarized light includes an ordinary light (o-light) with a vibration direction perpendicular to the first section. In FIG. 2, the vibration direction of the first polarized light is represented by a short horizontal line, and the vibration direction of the second polarized light is represented by a dot.

As shown in FIG. 1 and FIG. 2, the birefringent component 21 has a first region A1 and a second region A2. The first polarized light corresponds to the first region A1, and the second polarized light corresponds to the second region A2. The first region A1 and the second region A2 at least partially do not overlap in a light propagating direction. As shown in FIG. 1, an exiting surface of the birefringent component 21 has the first region A1 and the second region A2. The first polarized light corresponds to the first region A1. That is, the first polarized light is emitted from the first region A1. The second polarized light corresponds to the second region A2. That is, the second polarized light is emitted from the second region A2.

When the backlight assembly operates, the light source 1 emits light. As shown in FIG. 2, a light enters the birefringent component 21 along a preset direction h0, and is divided, in the birefringent component 21, into the first polarized light and the second polarized light that have polarization directions perpendicular to each other and that have light propagating directions intersect with each other. That is, a light propagating direction of the first polarized light and a light propagating direction of the second polarized light are not parallel to each other. Then, the first polarized light and the first polarized light corresponding to the light are emitted from different positions on the exiting surface of the birefringent component 21 along the preset direction h0. FIG. 2 illustrates that the preset direction h0 is perpendicular to the incident surface of the birefringent component 21. As shown in FIG. 2, the first region A1 is a region where the exiting surface of the birefringent component 21 includes the first polarized light, and the second region A2 is a region where the exiting surface of the birefringent component 21 includes the second polarized light. The first region A1 and the second region A2 at least partially do not overlap in the preset direction h0.

FIG. 2 illustrates only one light of multiple light emitted by the light source 1. In addition to this light, the light source 1 can also emit multiple light. Correspondingly, multiple first polarized light and multiple second polarized light emit from the birefringent component 21. Therefore, the first region A1 may include multiple first polarized light corresponding to different incident light, and the second region A2 may include multiple second polarized light corresponding to different incident light.

As shown in FIG. 1 and FIG. 2, the first dimmer 31 is located at the side of the birefringence component 21 away from the light source 1. In some embodiments of the present disclosure, the first dimmer 31 is disposed corresponding to the first region A1. That is, the first dimmer 31 is located on an optical path of the first polarized light emitted from the birefringent component 21 to receive the first polarized light emitted from the birefringent component 21 and to adjust the light propagating direction of the first polarized light, so that the first polarized light that enters the first dimmer 31 along the preset direction h0 propagates along the first direction h1 after passing through the first dimmer 31. The first direction h1 is an exiting direction along which the first polarized light emits from the first dimmer 31. The first direction h1 intersects the preset direction h0. That is, the first direction h1 is not parallel to the preset direction h0.

In some embodiments of the present disclosure, as shown in FIG. 1, the second polarized light propagates along the second direction h2, and the first direction h1 intersects with the second direction h2. That is, the first direction h1 is not parallel to the second direction h2.

In some embodiments of the present disclosure, the backlight assembly includes the birefringent component 21, the birefringent component 21 can be used to divide the light emitted by the light source 1 into the first polarized light and the second polarized light, and the first polarized light and the second polarized light emit from the first region A1 and the second region A2, respectively.

In some embodiments of the present disclosure, by providing the first dimmer 31, the light propagating direction of the first polarized light incident on the first dimmer 31 can be adjusted, so that the light propagating direction of the first polarized light emitted from the first dimmer 31 intersects with the light propagating direction of the second polarized light. That is, setting the light propagating direction of the first polarized light emitted from the first dimmer 31 to be not parallel to the light propagating direction of the second polarized light. In this way, the first polarized light and the second polarized light are emitted from the backlight assembly along different light propagating directions, and, then the first polarized light and the first polarized light propagating in different directions can be utilized. Based on such configuration, there is no need to increase the number of backlight assemblies, and the power consumption of the backlight assembly and the heat generated by the backlight assembly during operation can be reduced.

In some embodiments of the present disclosure, the first region A1 and the second region A2 at least partially do not overlap in the light propagating direction, so that the first dimmer 31 adjusts the light propagating direction of the first polarized light, and the light propagating direction of the second polarized light is not affected by the first dimmer 31.

Figure 3:
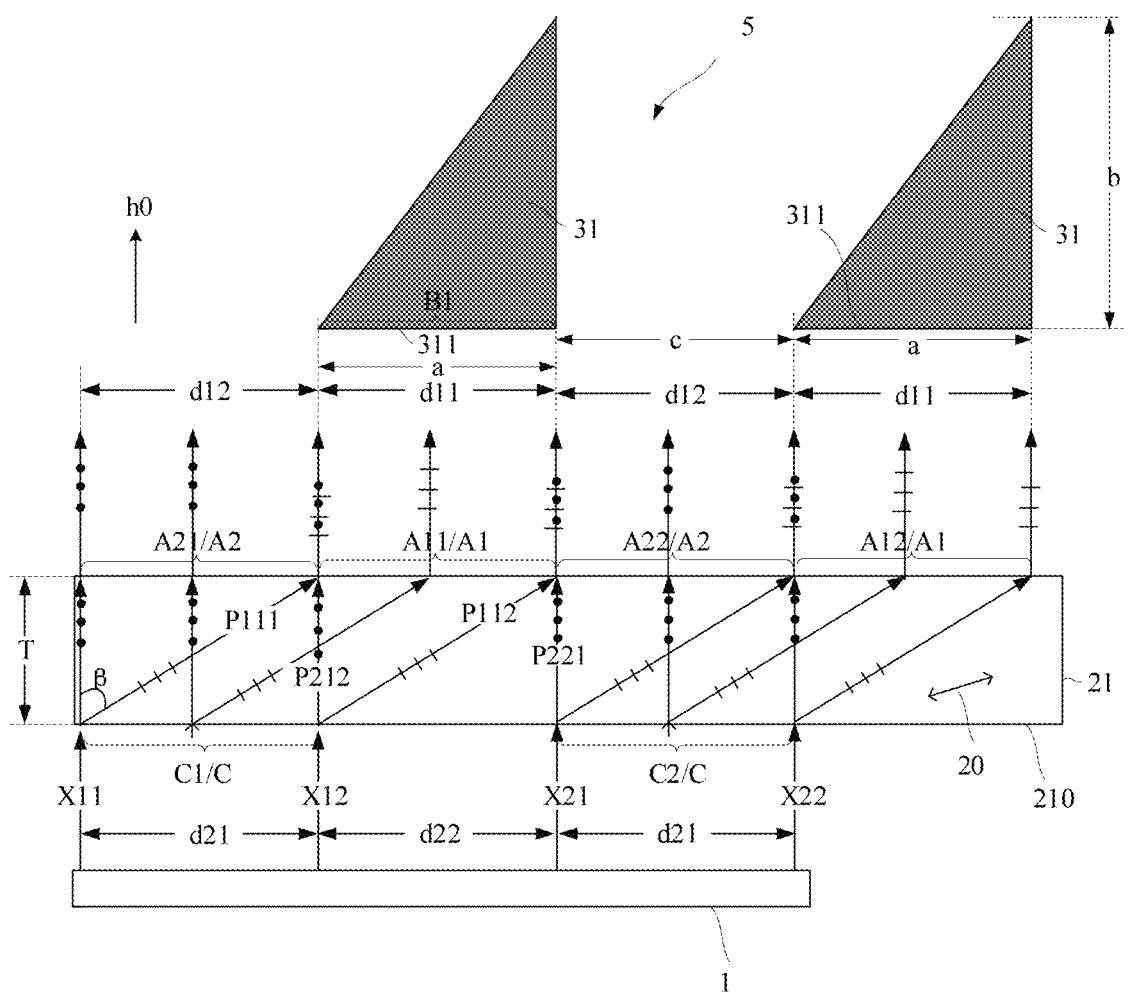
FIG. 3 is another schematic diagram of an optical path shown in FIG. 1 according to some embodiments of the present disclosure.

FIG. 3 is another schematic diagram of an optical path shown in FIG. 1. For example, as shown in FIG. 3, the birefringent component 21 includes a first surface 210. The first surface 210 is located at the side of the birefringent component 21 adjacent to the light source 1. A length of the first region A1 on the first section is d11, and a length of the second region A2 on the first section is d12. In some embodiments of the present disclosure, the first surface 210 can include multiple incident regions C spaced apart from each other. A length of the incident region C on the first section is d21. A gap between two adjacent incident regions C on the first section has a length d22. The incident region C is configured to receive the light emitted by the light source 1, and a region between two adjacent incident regions C is not configured to receive the light emitted by the light source 1. That is, the portion of the first surface 210 located in the incident region C is the incident surface of the birefringent component 21.

As shown in FIG. 3, a length T of the birefringent component 21 in a direction perpendicular to the first surface 210 and an angle β between the light propagating direction of the first polarized light in the birefringent component 21 and the light propagating direction of the second polarized light in the birefringent component 21 satisfy 0<d21≤T tan β≤d22.

Based on such configuration, the first region A1 and the second region A2 can be set not to overlap in the light propagating direction to avoid that both the first polarized light and the second polarized light emit from a region of the birefringent component 21 (that is, the first polarized light and the second polarized light are spatially inseparable), the light propagating direction of the first polarized light is adjusted by the first dimmer 31 while the light propagating direction of the second polarized light is not affected by the first dimmer 31.

When the birefringent component includes a positive uniaxial crystal, $$\beta = \alpha - \arctan\left(\frac{n_o^2}{n_e^2}\tan\alpha\right),$$

when the birefringent component includes a negative uniaxial crystal, $$\beta = \arctan\left(\frac{n_o^2}{n_e^2}\tan\alpha\right) - \alpha,$$

where $n_e$ represents a principal refractive index of e-light of the birefringent component 21, $n_o$ is represents a refractive index of o-light of the birefringent component 21, and α is an angle between an optical axis of the birefringent component 21 and a normal of the e-light. The normal of the e-light can be parallel to the light propagating direction of the o-light. Both FIG. 2 and FIG. 3 illustrate that the birefringent component 21 includes a positive uniaxial crystal, and the light propagating direction h0 of the incident light beam is perpendicular to the incident surface of the birefringent component 21.

As shown in FIG. 3, FIG. 3 illustrates that multiple incident regions C include a first incident region C1 and a second incident region C2 that have a same length d21 on the first section, a first incident light beam emitted to the first incident region C1 includes a first incident light X11 and a second incident light X12. The first incident light X11 is emitted towards a boundary of the first incident region C1 away from the second incident region C2. The second incident light X12 is emitted towards a boundary of the first incident region C1 adjacent to the second incident region C2. A second incident light beam emitted to the second incident region C2 includes a third incident light X21 and a fourth incident light X22 that emit to the second incident region C2. The third incident light X21 is emitted towards a boundary of the second incident region C2 adjacent to the first incident region C1, and the fourth incident light X22 is emitted towards a boundary of the second incident region C2 away from the first incident region C1. Multiple incident light in the first incident light and the second incident light each will be divided into a first polarized light and a second polarized light in the birefringent component 21, and then the first polarized light and the second polarized light emit from the birefringent component 21.

For example, as shown in FIG. 3, the first regions A1 include a first sub-region A11 and a third sub-region A12, and the second regions A2 include a second sub-region A21 and a fourth sub-region A22. The first polarized light in the first sub-region A11 and the second polarized light in the second sub-region A21 are all generated by incident light from the first incident region C1. The first polarized light in the third sub-region A12 and the second polarized light in the fourth sub-region A22 are all generated by incident light from the second incident region C2.

In some embodiments of the present disclosure, d21=T tan β, so that the first region A1 and the second region A2 respectively including the first polarized light and the second polarized light that are generated by dividing light beams incident to a same incident region C are just separated from each other. Taking FIG. 3 as an example, for the multiple light in the first incident light beam that enters the birefringent component 21 through the first incident region C1, based on d21=T tan β, a position where the first polarized light P111 generated by the first incident light X11 exits and a position where the second polarized light P212 generated by the second incident light X12 exactly coincide. That is, the first sub-region A11 and the second sub-region A21 being exactly not overlap in the light propagating direction.

Figure 4:
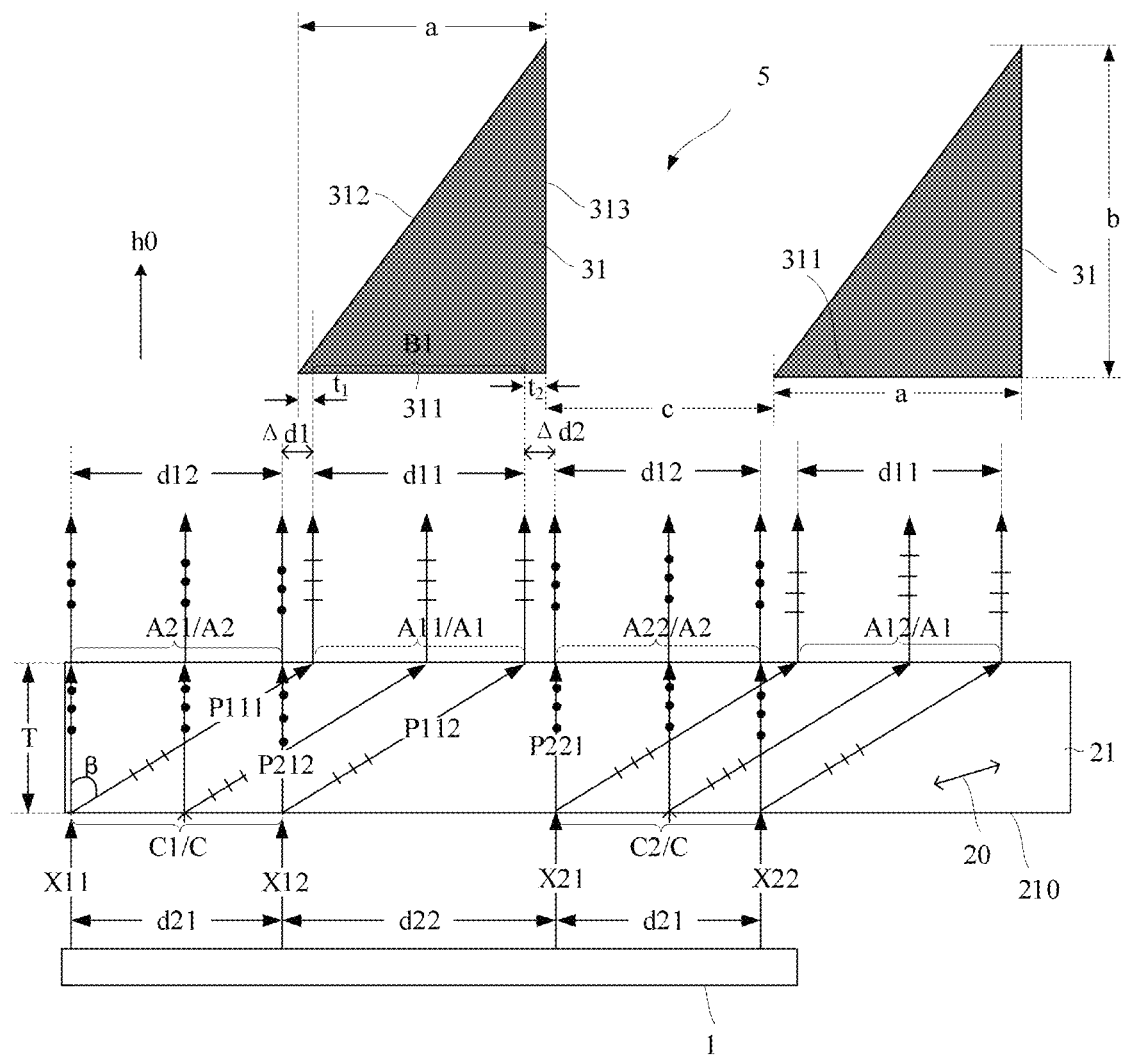
FIG. 4 is another schematic diagram of a backlight assembly and its optical path according to some embodiments of the present disclosure.

In some embodiments of the present disclosure, d21<T tan β, so that a distance is formed between the first region A1 and the second region A2 respectively including the first polarized light and the second polarized light that are generated by dividing light incident to a same incident region C. FIG. 4 is another schematic diagram of an optical path of a backlight assembly according to some embodiments of the present disclosure, As shown in FIG. 4, d21<T tan β. As shown in FIG. 4, by setting d21<T tan β, a position where the second polarized light P212 generated by the second incident light X12 exits is located at a side, away from the first sub-region A11, of a position where the first polarized light P111 generated by the first incident light X11 exits, and a position where the first polarized light P111 generated by the first incident light X11 exits is located at a side, away from the second sub-region A21, of a position where the second polarized light P212 generated by the second incident light X12 exits. A distance Δd1 is formed between the first sub-region A11 and the second sub-region A21. Neither the first polarized light nor the second polarized light emits from this region. That is, the first sub-region A11 and the second sub-region A21 can be completely separated from each other without overlapping in the light propagating direction.

For example, in some embodiments of the present disclosure, d22=T tan β, so that the first region A1 and the second region A2 respectively corresponding to two adjacent incident regions C can be just separated from each other. With continued reference to FIG. 3, d22=T tan β, and it can be seen that a position where the first polarized light P112 generated by the second incident light X12 exactly coincides with a position where the second polarized light P221 generated by the third incident light X21 exits. That is, the first sub-region A11 and the fourth sub-region A22 are completely separated from each other and do not overlap in the light propagating direction.

In some embodiments of the present disclosure, T tan β<d22, so that a distance is formed between the first region A1 and the second region A2 respectively including the first polarized light and the second polarized light that are generated by dividing light incident to a same incident region C. With reference to FIG. 4, T tan β<d22, and it can be seen that a position where the first polarized light P112 exits is staggered from a position where the second polarized light P221 exits, and a distance Δd2 between the first sub-region A11 and the fourth sub-region A22 is formed. Neither the first polarized light nor the second polarized light emits from this region. That is, the first sub-region A11 and the fourth sub-region A22 can be completely separated in the light propagating direction without overlapping.

FIG. 3 and FIG. 4 only illustrate that the length of the first incident region C1 on the first section equals to the length of the second incident region C2 on the first section. In some embodiments of the present disclosure, the length of the first incident region C1 on the first section can be not equal to the length of the second incident region C2 on the first section. For example, one of the length of the first incident region C1 on the first section and the length of the second incident region C2 on the first section may be T tan β, and the other one of the length of the first incident region C1 on the first section and the length of the second incident region C2 on the first section may be smaller than T tan β. In some embodiments of the present disclosure, the length of the first incident region C1 on the first section and the length of the second incident region C2 on the first section have two different values each smaller than T tan β, which is not limited in the embodiment of the present disclosure.

For example, as shown in FIG. 3 and FIG. 4, d11=d12. With such configuration, when the number of the first regions A1 equals to the number of the second regions A2, an area of a region of the birefringent component 21 where the first polarized light emits is equal to an area of a region of the birefringent component 21 where the second polarized light emits.

Figure 5:
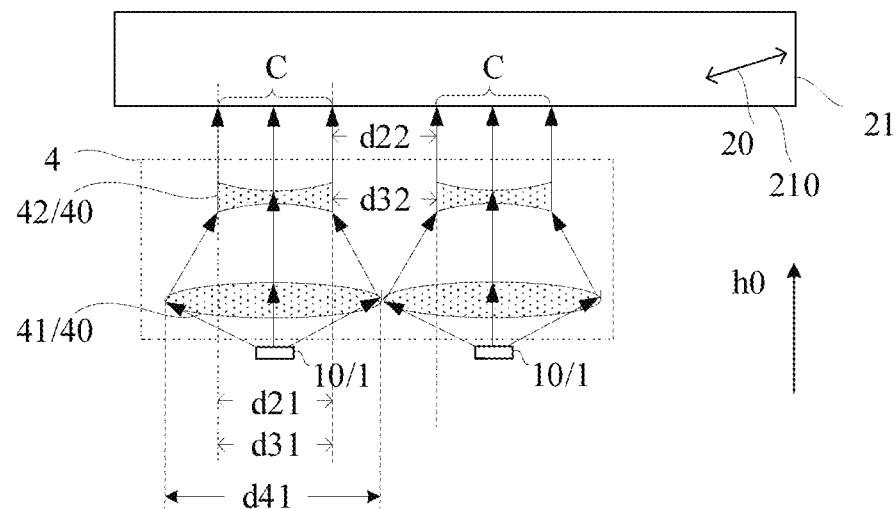
FIG. 5 is another schematic diagram illustrating a light source, a birefringent component, and second dimmer and related optical paths in a backlight assembly according to some embodiments of the present disclosure.

FIG. 5 is another schematic diagram of a backlight assembly and its optical path according to some embodiments of the present disclosure. In some embodiments of the present disclosure, as shown in FIG. 5, the backlight assembly includes a second dimmer 4 located between the light source 1 and the birefringent component 21, the second dimmer 4 is configured to adjust the light incident on the birefringent component 21 to be an incident light beam including multiple incident light corresponding to the incident region C. The incident light beam includes multiple incident light, and the light are not incident to a gap between the two adjacent incident regions C. FIG. 5 illustrates that the incident light is incident on the first surface 210 of the birefringent component 21 along the preset direction h0.

With the second dimmer 4, light incident on the birefringent component 21 can be divided into multiple incident light beams arranged at intervals, thereby causing the first polarized light and the second polarized light subsequently emitted from the birefringent component 21 to be respectively located in the first region A1 and the second region A2 that at least partially do not overlap. With such configuration, there is no need to adjust the structure of the birefringent component 21 and it is easy to implement.

In some embodiments of the present disclosure, as shown in FIG. 5, the second dimmer 4 includes multiple micro-lens groups 40. The micro-lens group 40 includes a convex lens 41 and a concave lens 42. The convex lens 41 is located at a side of the concave lens 42 away from the birefringent component 21, and the concave lens 42 is provided corresponding to the incident region C of the birefringent component 21. When the backlight assembly operates, light emitted by the light source first passes through the convex lens 41, the convex lens 41 can converge light towards an object focus of the concave lens 42, and the concave lens 42 can make the converged light become parallel light and emit them to the incident region C of the birefringent component 21. As shown in FIG. 5, no light is emitted between two adjacent concave lenses 42. That is, the micro-lens group 40 including the convex lens 41 and the concave lens 42 can make the light emitted by the light source 1 pass through the micro-lens group 40 and be adjusted into narrow light parallel to each other and corresponding to the incident regions C of the birefringent component 21. In this way, the first region A1 and the second region A2 of the birefringent component 21 at least partially do not overlap in the light propagating direction, and then the light propagating direction of the first polarized light is adjusted by the first dimmer 31 while it is avoided that the light propagating direction of the second polarized light is affected by the first dimmer 31.

In some embodiments of the present disclosure, as shown in FIG. 5, the light source 1 can be configured to include multiple light sub-sources 10 respectively corresponding to different micro-lens groups 40. In some embodiments of the present disclosure, the light sub-source 10 includes a strip light source, and an extension direction of the strip light source is perpendicular to the first section. In some embodiments of the present disclosure, the light sub-source 10 can also be a point light source, and multiple light sub-sources 10 can be arranged in an array in a plane parallel to the incident surface of the birefringent component 21.

In some embodiments of the present disclosure, the concave lens 42 has a first effective region, and the first effective region is a region of the concave lens 42 that can transmit a light beam. In some embodiments of the present disclosure, all parts of the concave lens 42 can be set to be able to transmit the light beam. That is, a width of the first effective region on the first section is equal to a width of the concave lens 42 on the first section. In some embodiments of the present disclosure, a part region of the concave lens 42 can be used as the first effective region that can transmit the light beam, and the other region of the concave lens 42 can be used as an ineffective region that cannot transmit light beam. That is, a width of the first effective region on the first section is smaller than a width of the concave lens 42 on the first section. As shown in FIG. 5, all parts of the concave lens 42 are set to be able to transmit the light beam. That is, the width of the first effective region on the first section is equal to the width of the concave lens 42 on the first section. The width of the first effective region on the first section is d31, and the width of the convex lens 41 on the first section is d41. A width direction of the concave lens 42 and a width direction of the convex lens 41 are both perpendicular to the light propagating direction of the incident light; a distance between two adjacent concave lenses 42 is d32, two adjacent convex lenses 41 are in contact with each other, d41>d31=d21, and d32=d22. With such design, an area of a region where the light emits from the concave lens 42 can be equal to an area of the incident region C of the birefringent component 21, so that the concave lens 42 corresponds to the incident regions C of the birefringent component 21, and a gap between two adjacent concave lenses 42 corresponds to a gap between two adjacent incident regions C and then all the light emitted from the concave lens 42 can be incident to the incident regions C of the birefringent component 21.

In some embodiments of the present disclosure, the length a of the incident surface of the first dimmer 31 on the first section satisfies: a≥d11>0. FIG. 3 illustrates a=d11. FIG. 4 illustrates a>d11.

In some embodiments of the present disclosure, a-d11, the incident surface 311 of the first dimmer 31 and the first region A1 of the birefringent component 21 are correspondingly arranged in the light propagating direction of the light, so that the first polarized light emitted from the first region A1 of the birefringent component 21 can be exactly incident on the first dimmer 31 without setting the size of the first dimmer 31 to be too large.

In other embodiments of the present disclosure, as shown in FIG. 4, when a distance is formed between the first region A1 and the second region A2, a>d11, the incident surface of the first dimmer 31 corresponds to the first region A1, and the remaining parts of the first dimmer 31 correspond to the gap between the first region A1 and the second region A2, thereby achieving that the first dimmer 31 can receive all the first polarized light emitted from the first region A1.

For example, a distance c between two adjacent first dimmers 31 satisfies c≥d12>0. FIG. 3 illustrates c=d12. FIG. 4 illustrates c>d12. For example, in some embodiments of the present disclosure, a region between two adjacent first dimmers 31 can correspond to the second region A2 of the birefringent component 21, so that the second polarized light emitted from the second region A2 can avoid the first dimmer 31 and emitted to the region between two adjacent first dimmers 31.

In some embodiments of the present disclosure, as shown in FIG. 2, the first dimmer 31 includes the incident surface 311, a second surface 312, and a third surface 313. The second surface 312 intersects the incident surface 311, and an angle θ1 between the second surface 312 and the incident surface 311 satisfies 0°<θ1<90°, the third surface 313 and the incident surface 311 intersect and are perpendicular to each other. The third surface 313 intersects with the second surface 312. After the first polarized light enters the first dimmer 31 through the incident surface 311, the first polarized light may be reflected at the second surface 312. As shown in FIG. 2, the reflected light is incident on the third surface 313 with an incident angle $\theta_i$, and then emits from the third surface 313 with a refraction angle $\theta_r$. In some embodiments of the present disclosure, the third surface 313 is perpendicular to the incident surface 311, while utilizing the second surface 312 to receive the incident first polarized light, it is prevented that the first polarized light that enters the first dimmer 31 through the incident surface 311 is directly incident on the third surface 313, thereby preventing the first dimmer 31 from emitting the first polarized light with two different propagating directions.

In some embodiments of the present disclosure, as shown in FIG. 1 and FIG. 2, the backlight assembly includes a first portion 5, one part of which is located at a side of the second surface 312 away from the first dimmer 31, and the other part of which is located at a side of the third surface 313 away from the first dimmer 31. The first portion 5 is in contact with both the second surface 312 and the third surface 313. That is, the second surface 312 and the third surface 313 are interfaces between the first dimmer 31 and the first portion 5. In some embodiments of the present disclosure, a refractive index $n_1$ of the first dimmer 31 and a refractive index $n_2$ of the first portion 5 satisfy: $n_2 > n_1$.

In some embodiments of the present disclosure, $$\sin\theta_1 \geq \frac{n_2}{n_1},$$

and the first polarized light reflected by the second surface 312 is refracted out of the first dimmer 31 through the third surface 313 while, as shown in FIG. 2, the first polarized light can be totally reflected at the second surface 312, thereby preventing the first polarized light from being emitted from the first dimmer 31 through the second surface 312. That is, based on such configuration, while the third surface 313 serves as the exiting surface of the first dimmer 31, it is avoided that the second surface 312 also serves as the exiting surface of the first dimmer 31, so that the first polarized light with only one propagating direction is emitted from the first dimmer 31. The propagating direction of the first polarized light emitted from the third surface 313 is the first direction h1.

Based on such configuration, the refraction angle $\theta_r$ emitted from the third surface 313 can also be greater than the incident angle θi, thereby increasing the angle between the light emitted from the third surface 313 and the incident surface 311. When the backlight assembly includes multiple first dimmers 31, it is helpful to prevent the first polarized light emitted from the third surface 313 of one of the first dimmers 31 from being reflected and refracted to be divided when being incident on another first dimmer 31.

In some embodiments of the present disclosure, the first portion 5 includes a uniform medium, so that the propagating direction of the second polarized light has an unchanged propagating direction after passing through the first portion 5. That is, the second polarized light can still propagate along the preset direction h0 after passing through the first portion 5.

In some embodiments of the present disclosure, when manufacturing the backlight assembly, the first dimmer 31 can be disposed in an environment with a uniform medium, and the medium is the first portion 5.

For example, as shown in FIG. 3 and FIG. 4, a length a of the incident surface 311 of the first dimmer 31 on the first section and a length b of the third surface 313 on the first section satisfy: a<b, so that the first polarized light can emit from the first dimmer 31 from the third surface 313.

As shown in FIG. 3 and FIG. 4, the incident surface 311 of the first dimmer 31 has a second effective region B1. The second effective region B1 corresponds to the first region A1 in the preset direction h0. In some embodiments of the present disclosure, an area of the second effective region B1 is smaller than or equal to an area of the incident surface 311. FIG. 4 illustrates that the area of the second effective region B1 is smaller than the area of the incident surface 311. As shown in FIG. 4, a first distance $t_1$ between a first boundary of the incident surface 311 and the second effective region B1 satisfies t1>0, and a second distance $t_2$ between a second boundary and the second effective region B1 satisfies t2>0. The first boundary is a boundary of the incident surface 311 adjacent to the second surface 312, and the second boundary is a boundary of the incident surface 311 adjacent to the third surface 313. FIG. 3 illustrates that the area of the second effective region B1 is equal to the area of the incident surface 311, and the boundary of the incident surface 311 coincides with the boundary of the second effective region B1. That is, the first distance and the second distance are both 0.

For example, b satisfies:

$$b \geq a\left(-X + \sqrt{X^2 + 1}\right), \text{ and} \quad (1)$$

$$X = -\sqrt{\frac{\left(\frac{a+c}{a-t_1}\right)^2 - \left(2 - \frac{n_1^2}{n_2^2}\right) - \sqrt{\left(\frac{a+c}{a-t_1}\right)^4 - \left(4 - 2\frac{n_1^2}{n_2^2}\right)\left(\frac{a+c}{a-t_1}\right)^2 + \left(3\frac{n_1^2}{n_2^2} - 2\right)^2}}{4 - 4\frac{n_1^2}{n_2^2}}}, \quad (2)$$

where c represents a distance between two adjacent first dimmers 31.

For example, when the second boundary of the incident surface 311 coincides with the boundary of the second effective region B1. That is, $t_2=0$, $$b = a\left(-X + \sqrt{X^2 + 1}\right). \quad (3)$$

Figure 6:
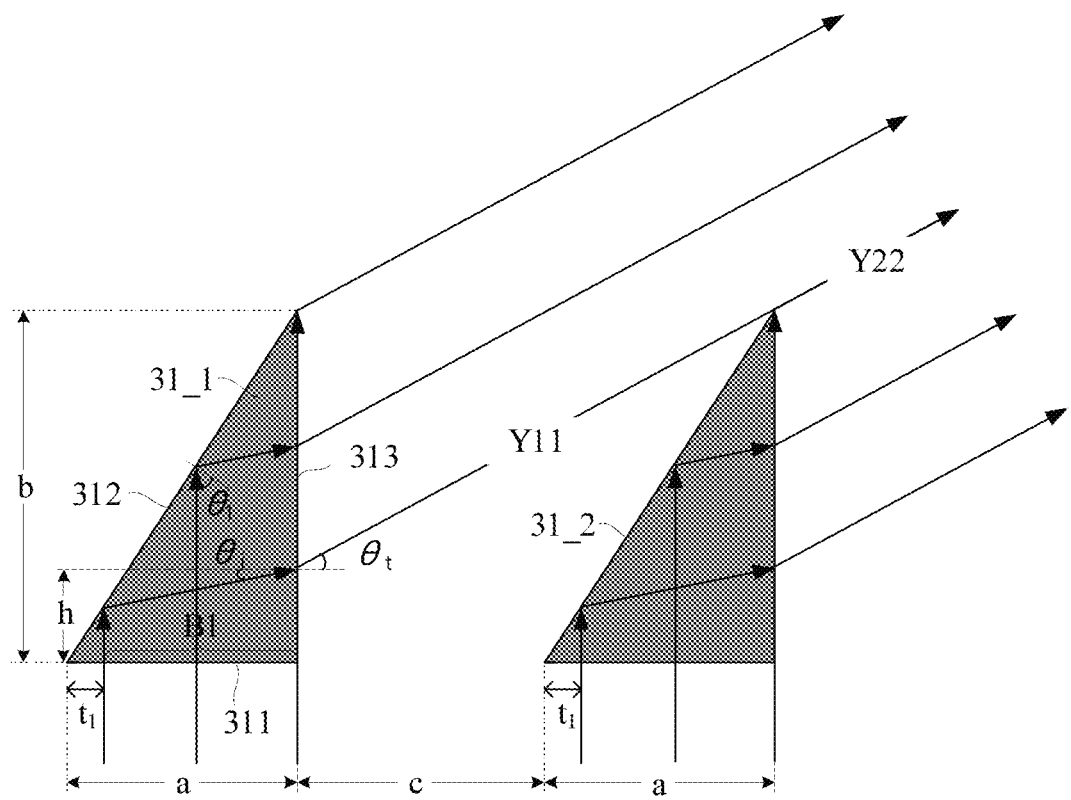
FIG. 6 is a schematic diagram of a first dimmer and its optical path according to some embodiments of the present disclosure.
Figure 7:
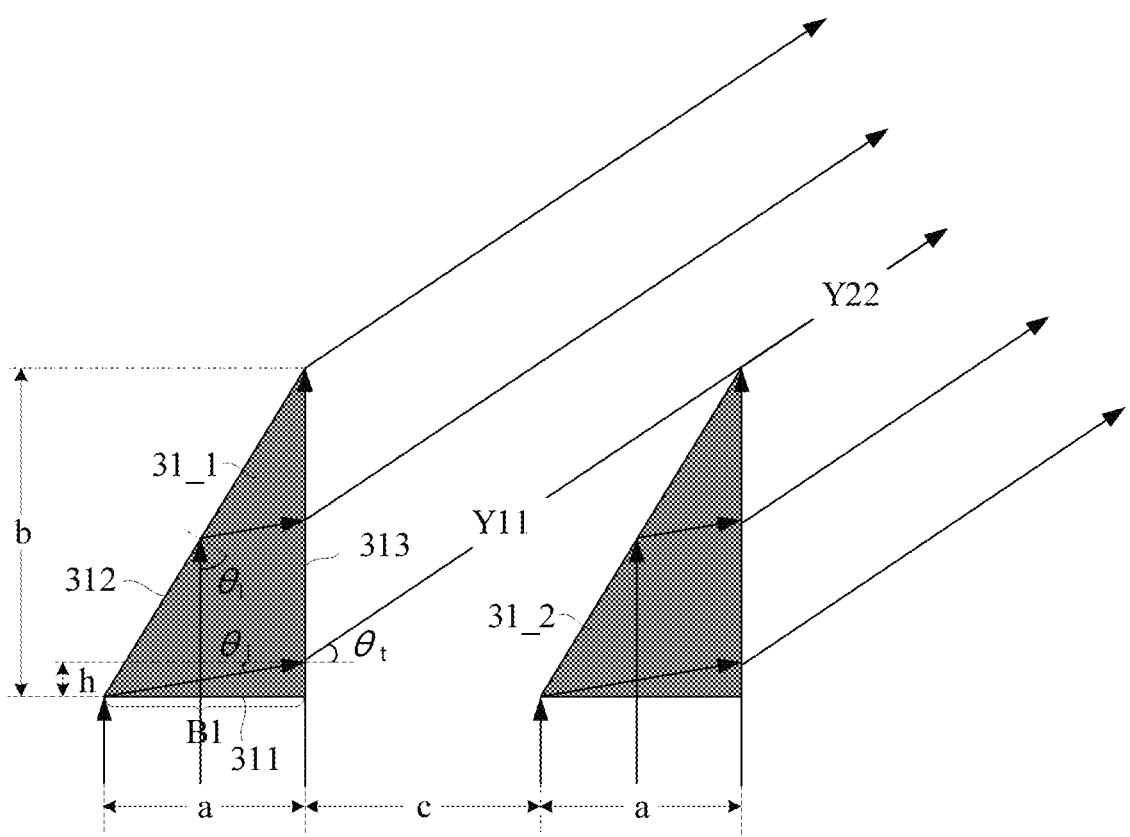
FIG. 7 is another schematic diagram of a first dimmer and its optical path according to some embodiments of the present disclosure.

FIG. 6 and FIG. 7 are schematic diagrams of two first dimmers and their optical paths provided by some embodiments of the present disclosure, and illustrate two first dimmers that are marked with 31_1 and 31_2, respectively. FIG. 6 illustrates that a first distance $t_1$ between the first boundary of the incident surface 311 and the second effective region B1 satisfies $t_1>0$, and the second boundary of the incident surface 311 and the second effective region B1. As an illustration, the boundaries of the area B1 overlap. FIG. 7 illustrates that both the first boundary and the second boundary of the incident surface 311 coincide with the boundary of the second effective region B1. That is, the first distance and the second distance each are equal to 0. In some embodiments of the present disclosure, b satisfies the formula (3), tan $\theta_r$=(b−h)/(a+c), where, h=$t_1$ tan $\theta_1$+(a−$t_1$)tan $\theta_r$, b=a tan $\theta_1$, $n_2$ sin $\theta_r$=$n_1$ sin $\theta_i$. That is, a refracted light Y11 emitted from the first dimmer 31_1 in FIG. 6 and FIG. 7 can pass through an end point of the first dimmer 31_2, and the refracted light Y11 coincides with a refracted light Y22 after passing through the end point of the first dimmer 31_2. That is, no gap is formed between the first polarized light emitted from the first dimmer 31_1 and the first polarized light emitted from the first dimmer 31_2. With such design, when the light sub-source 10 is configured as a strip-shaped light source extending on a direction perpendicular to the first section, without providing a component for expanding the first polarized beam, light-emitting uniformity of the first polarized light emitted by the backlight assembly can be improved.

For example, $n_1$=1.5 and $n_2$=1. In this case, a critical angle $\theta_c$ of the first polarized light incident on the second surface 312 satisfies: $\theta_c$=arcsin($n_2/n_1$)=41.81°.

Based on the configuration provided by the embodiments of the present disclosure, when a=c and $t_1$=0, n1 and n2 are substituted into the formula (2) to obtain: X=−0.65 and b/a=1.84, that is, tan $\theta_1$=b/a=1.84, the calculated value of $\theta_1$ is 61.48° which is greater than $\theta_c$. Therefore, based on the configuration provided by the embodiments of the present disclosure, after the first polarized light is vertically incident on the incident surface 311, the first polarized light can be completely reflected at the second surface 312 to prevent the first polarized light from being emitted from the second surface 312 of the first dimmer 31.

In some embodiments of the present disclosure, according to the Fresnel equation, the polarization angle $\theta_p$ of the third surface 313 can be calculated to satisfy: $\theta_p$=arctan($n_2/n_1$)= 33.69°.

Based on the formula (2) and formula (3), the incident angle $\theta_i$ of the first polarized light actually incident on the third surface 313 can be calculated: tan $\theta_i$=−X=0.65, and it can be calculated that $\theta_i$=arctan 0.65=33.02°. It can be seen that, based on the configuration of the embodiments of the present disclosure, the actual incident angle $\theta_i$ of the light that is totally reflected by the second surface 312 and incident on the third surface 313 can approach a polarization angle of the third surface 313. When a linearly polarized light whose vibration direction is located in an incident plane is incident on the third surface 313, the linearly polarized light is almost completely emitted from the third surface 313. The incident plane is jointly defined by the light propagating direction and a normal of the third surface 313. Therefore, based on the configuration provided by the embodiments of the present disclosure, it is beneficial to increase luminous flux of the first polarized light refracted from the third surface 313 and prevent the first polarized light from being reflected by the third surface 313.

For example, in some embodiments of the present disclosure, tan $\theta_i$=tan $\theta_p$, and when a=c and t1=0, in combination with the formula (2), it can be calculated: $n_1/n_2$=1.53. In this case, only the refracted light will emit from the third surface 313 so that the reflected light disappears, which can increase the luminous flux of the first polarized light refracted from the third surface 313 and prevent the third surface 313 from reflecting the first polarized light.

Figure 8:
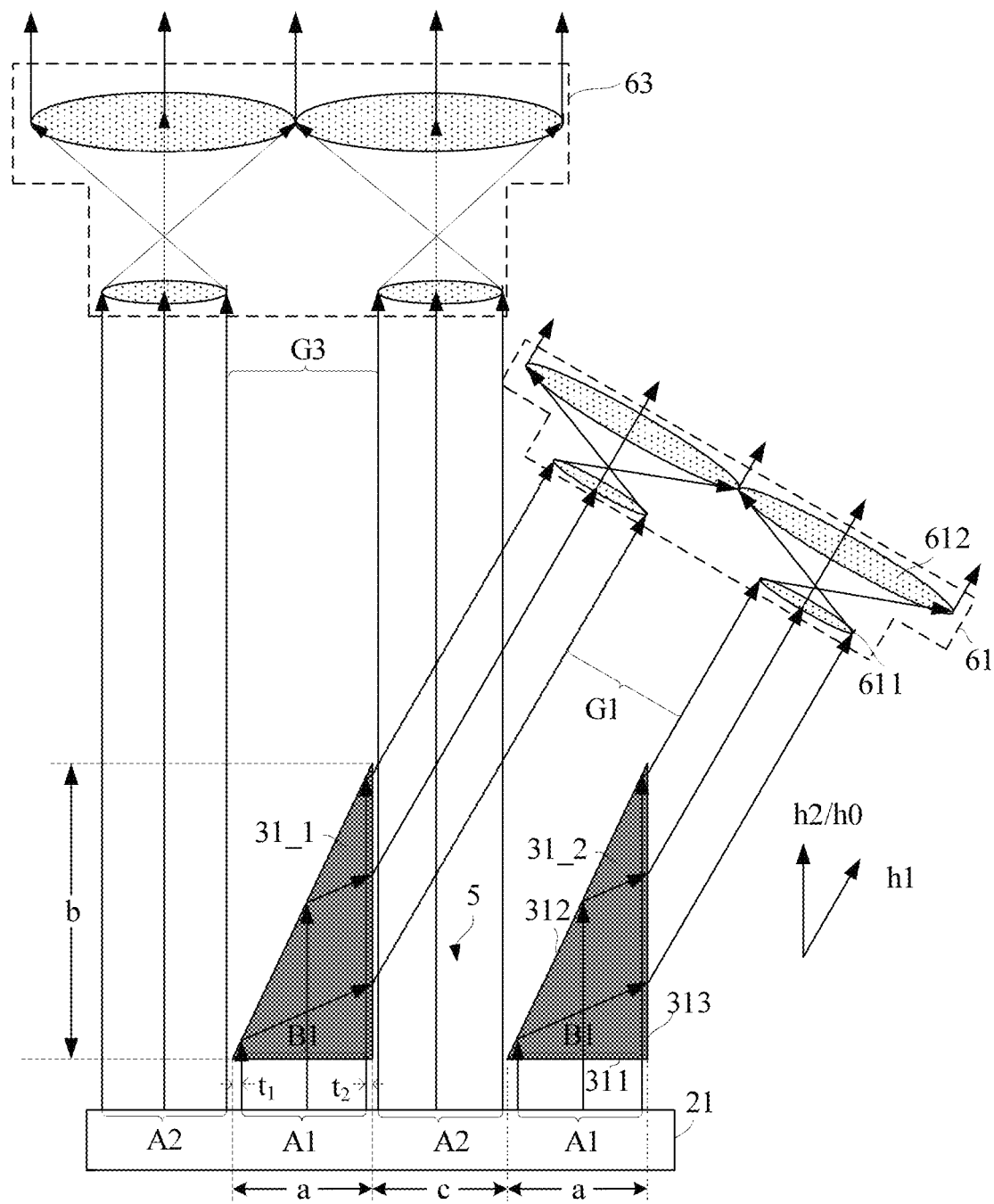
FIG. 8 is another schematic diagram of a backlight assembly and its optical path according to some embodiments of the present disclosure.

FIG. 8 is another schematic diagram of a backlight assembly and its optical path according to some embodiments of the present disclosure. With reference to FIG. 8, in the embodiments of the present disclosure, the backlight assembly can include a first beam expander 61. Along the first direction h1, the first beam expander 61 is located at a side of the third surface 313 away from the first dimmer 31 and is configured to expand a first polarized light beam emitted through the third surface 313 of the first dimmer 31. When a gap G1 is formed between the light propagating in the first direction h1 and emitted from the third surfaces 313 of two adjacent first dimmers 31, with the first beam expander 61 provided by the embodiments of the present disclosure, the width of the first polarized light beam can be increased, and, as shown in FIG. 8, an extension line of a light emitted from the first beam expander 61 can pass through the gap G1 between two adjacent first polarized beams, making the first polarized light emitted from the backlight assembly to be more uniform.

In the case where the first beam expander 61 is provided, for example, as shown in FIG. 8, $t_1>0$, $t_2>0$, and b satisfies formula (1). With such configuration, the width of the first polarized light beam is increased to make the first polarized light emitted from the backlight assembly more uniform. On the one hand, the first polarized light emitted from the first dimmer 31_1 can be prevented from being incident on the first dimmer 31_2. On the one hand, the accuracy requirements for the size of the first dimmer 31 can also be reduced.

Figure 9:
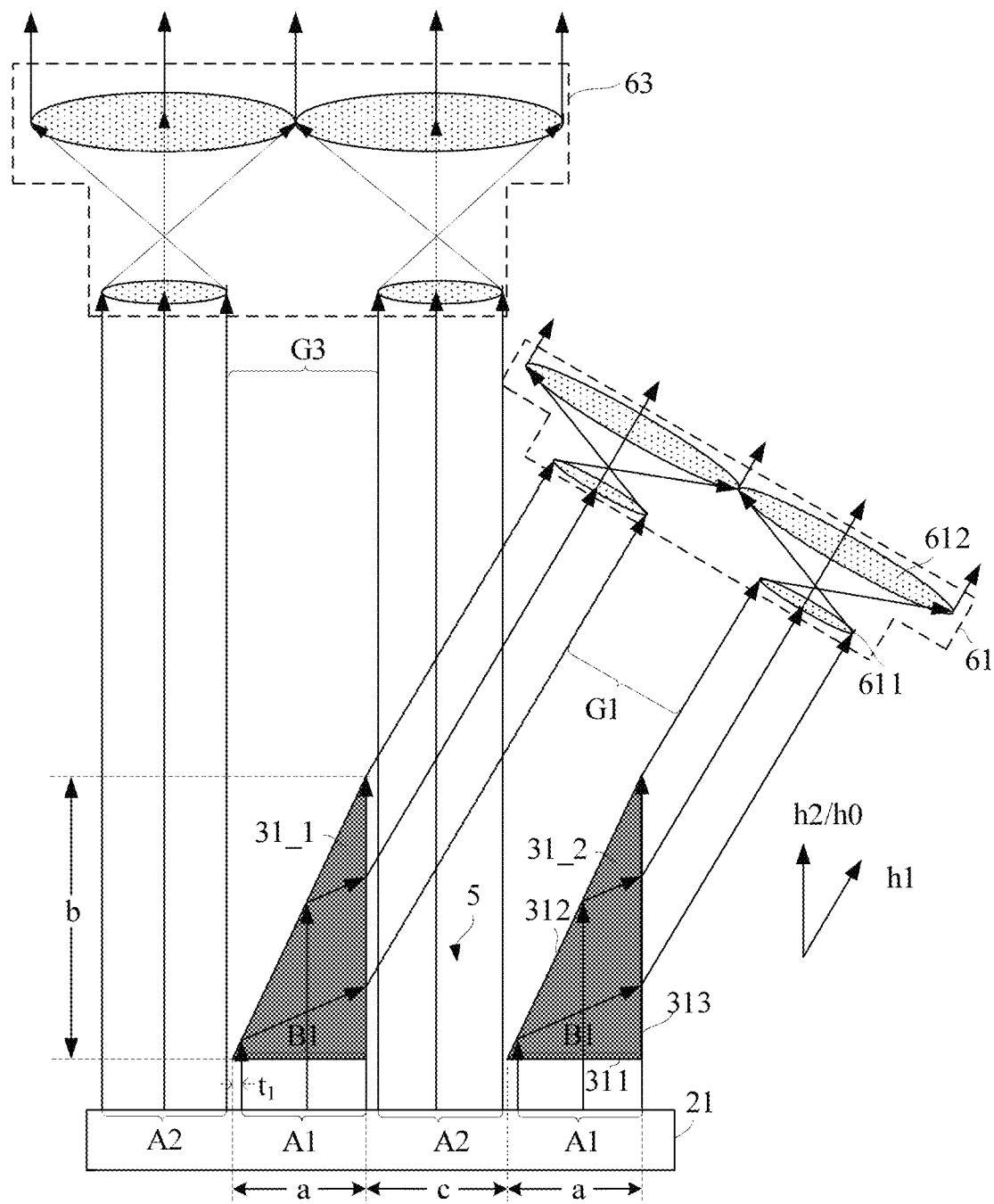
FIG. 9 is another schematic diagram of a backlight assembly and its optical path according to some embodiments of the present disclosure.

FIG. 9 is another schematic diagram of a backlight assembly and its optical path according to some embodiments of the present disclosure. In some embodiments of the present disclosure, as shown in FIG. 9, when providing the first beam expander 61, $t_1 \geq 0$, and the second boundary of the incident surface 311 coincides with the boundary of the second effective region B1, that is, $t_2=0$. In this case, the following is satisfied:

$$b > a\left(-X + \sqrt{X^2 + 1}\right). \quad (4)$$

With b satisfying formula (4), on the one hand, the first polarized light emitted from the first dimmer 31_1 is prevented from being incident on the first dimmer 31_2, and, on the other hand, the accuracy requirements of the size of the first dimmer 31 can also be reduced.

In some embodiments of the present disclosure, as shown in FIG. 8 and FIG. 9, the first polarized light incident on the first beam expander 61 and the first polarized light emitted from the first beam expander 61 both propagate along the first direction h1.

In some embodiments of the present disclosure, as shown in FIG. 8 and FIG. 9, the first beam expander 61 includes a divergence unit 611 and a collimation unit 612 that are arranged along the first direction h1. The divergence unit 611 is configured to diverge the first polarized light emitted from the first dimmer 31 to form a first polarized divergent light beam that is divergent and that has a relatively large width. The collimation unit 612 is configured to collimate the first polarized divergent light beam.

In some embodiments of the present disclosure, as shown in FIG. 8 and FIG. 9, the divergence unit 611 includes a first convex lens, the collimation unit 612 includes a second convex lens, a center of the first convex lens and a center of the second convex lens are arranged along the first direction h1, and the second convex lens is located at a side of the first convex lens away from the first dimmer 31. As shown in FIG. 8 and FIG. 9, an optical axis of the first convex lens and an optical axis of the second convex lens are both parallel to the first direction h1, and a distance between the center of the second convex lens and the center of the first convex lens is greater than a focal length of the first convex lens. The first polarized light beam first converges and then diverges after passing through the first convex lens, and then becomes parallel light after passing through the second convex lens. As shown in FIG. 8 and FIG. 9, a width of the first convex lens is smaller than a width of the second convex lens, the width of the convex lens is perpendicular to the first direction h1, a gap is formed between two adjacent first convex lenses, and two adjacent second convex lenses are in contact with each other.

The arrangements of the first convex lens and the second convex lens in FIG. 8 and FIG. 9 are only illustrated as examples. The embodiments of the present disclosure do not limit the structure of the first beam expander 61. Any other structures that can increase the width of the first polarized light beam fall within the scope of the present disclosure.

Figure 10:
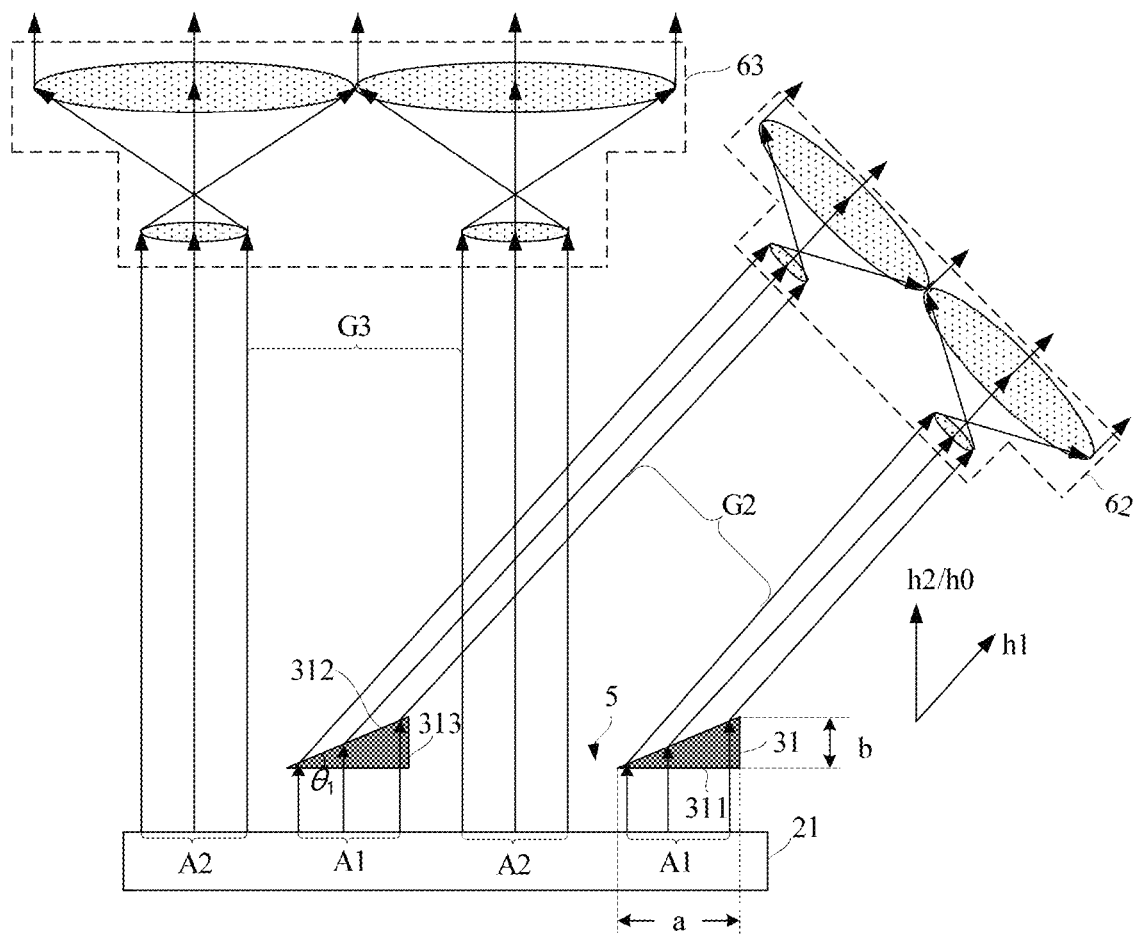
FIG. 10 is another schematic diagram of a backlight assembly and its optical path according to some embodiments of the present disclosure.

FIG. 10 is another schematic diagram of a backlight assembly and its optical path according to some embodiments of the present disclosure. In some embodiments of the present disclosure, as shown in FIG. 10, the first polarized light emitted from the birefringent component 21 passes through the incident surface 311 of the first dimmer 31 and then enters the first dimmer 31 along the preset direction h0. In some embodiments of the present disclosure, $$\sin\theta_1 < \frac{n_2}{n_1},$$

which can prevent the incoming first polarized light from being totally reflected at the second surface 312. That is, the second surface 312 can serve as the exiting surface of the first dimmer 31 so that the first polarized light is emitted from the second surface 312 along the first direction h1.

For example, in some embodiments of the present disclosure, $$\tan\theta_1 = \tan\theta_p = \frac{n_2}{n_1} = \frac{b}{a},$$

so that the first polarized light can be incident on the second surface 312 at a polarization angle. When the linearly polarized light with the vibration direction located in the incident plane is incident on the second surface 312, the reflected light will disappear and only the refracted light will be emitted from the second surface 312, and the incident plane is jointly defined by the light propagating direction and the normal of the second surface 312. Therefore, based on the above configuration, all first polarized light can be refracted by the second surface 312 along the first direction h1 without being reflected, thereby preventing the first polarized light reflected by the second surface 312 from being emitted towards the third surface 313 and emitted from the third surface 313. That is, based on such configuration, only the second surface 312 serves as the exiting surface of the first dimmer 31 to prevent the first polarized light from being emitted from the third surface 313 and avoid complicated optical paths.

In some embodiments of the present disclosure, as shown in FIG. 10, the backlight assembly includes a second light beam expander 62 configured to expand a first polarized light beam emitted through the second surface 312 of the first dimmer 31. When a gap G2 is formed between the first polarized light beams emitted from the second surfaces 312 of two adjacent first dimmers 31, the embodiments of the present disclosure provide the second light beam expander 62 to increase the width of the first polarized light beam, and, as shown in FIG. 10, the extension line of at least one light of the light emitted from the second light beam expander 62 can pass through the gap G2 between two adjacent first polarized light beams, which is beneficial to making the first polarized light emitted from the backlight assembly be more uniform.

For example, as shown in FIG. 10, the second light beam expander 62 can also be configured in a same manner as the first light beam expander 61, for example, the second light beam expander 62 includes the divergence unit formed by a first convex lens, and also includes the collimation unit formed by a second convex lens. In some embodiments of the present disclosure, the second light beam expander 62 may also have other structures capable of increasing the width of the first polarized light beam, which is not limited in the embodiments of the present disclosure.

For example, the first dimmer 31 includes a prism, and the first portion 5 includes air. The prism can separate the first polarized light and the second polarized light that emit from the backlight assembly, to make the first polarized light and the first polarized light have a high degree of polarization and have approaching energies without loss as far as possible, thus efficiently utilizing light-emitting of the light source, to reduce power consumption and heat generation. For example, the prism includes a right-angle prism.

Figure 11:
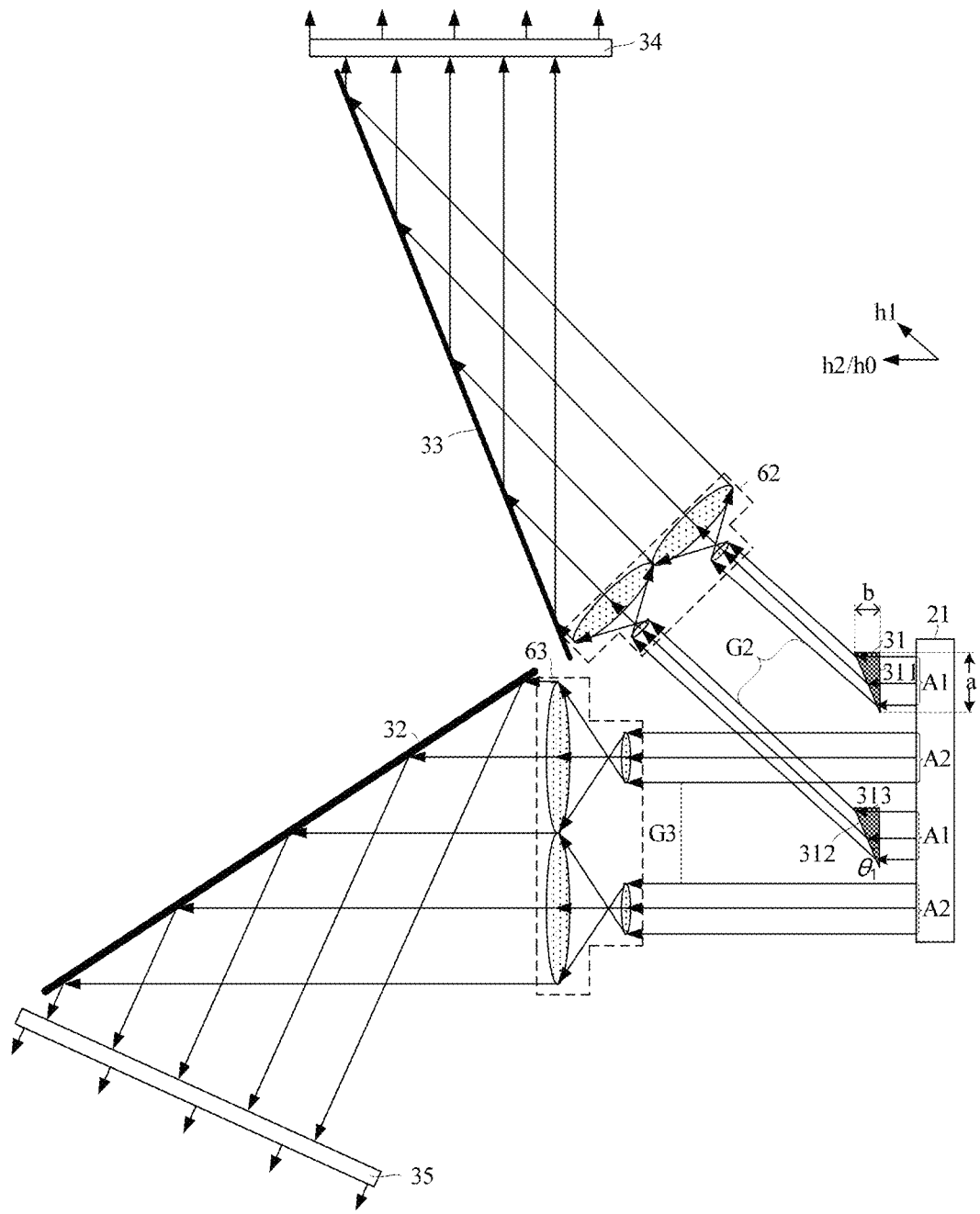
FIG. 11 is another schematic diagram of a backlight assembly and its optical path according to some embodiments of the present disclosure.

In some embodiments of the present disclosure, a first optical-path adjusting component may also be provided at a side of the first dimmer 31 away from the birefringence component 21. When arranging the first light beam expander 61 as shown in FIG. 8 and FIG. 9, for example, in some embodiments of the present disclosure, the first optical-path adjusting component can be disposed between the first dimmer 31 and the first light beam expander 61. That is, the first polarized light beam emitted from the third surface 313 of the first dimmer 31 first passes through the first optical-path adjusting component to adjust the propagating direction and then passes through the first light beam expander 61 to increase the width. In some embodiments of the present disclosure, the first optical-path adjusting component can also be disposed at a side of the first light beam expander 61 away from the first dimmer 31. That is, the first polarized light beam emitted from the third surface 313 of the first dimmer 31 first passes through the first light beam expander 61 to increase the width, and then passes through the first optical-path adjusting component to adjust the propagating direction. When arranging the second light beam expander 62 shown in FIG. 10, for example, in some embodiments of the present disclosure, the first optical-path adjusting component can be disposed between the first dimmer 31 and the second light beam expander 62. That is, the first polarized light beam emitted from the second surface 312 of the first dimmer 31 first passes through the first optical-path adjusting component to adjust the propagating direction and then passes through the second light beam expander 62 to increase the width. In some embodiments of the present disclosure, the first optical-path adjusting component is disposed at a side of the second beam expander 62 away from the first dimmer 31. That is, the first polarized light beam emitted from the second surface 312 of the first dimmer 31 first passes through the second light beam expander 62 to increase the width and then passes through the first optical-path adjusting component to adjust the propagating direction. FIG. 11 is another sectional view of a backlight assembly according to some embodiments of the present disclosure. As shown in FIG. 11, the first optical-path adjusting component 33 is disposed at a side of the second light beam expander 62 away from the first dimmer 31. With the first optical-path adjusting component 33, the propagating direction of the first polarized light emitted from the first dimmer 31 and propagating along the first direction h1 can be adjusted, so that the light-emitting direction of the first polarized light beam is controllable to meet different application needs. In some embodiments of the present disclosure, the first optical-path adjusting component 33 includes a component of changing the direction of light propagation, such as a reflector or a film-coated highly transmissive prism.

In some embodiments of the present disclosure, in some embodiments of the present disclosure, a first width-adjusting component may also be provided at the side of the first light beam expander 61 away from the first dimmer 31 or at the side of the second light beam expander 62 away from the first dimmer 31, and the first width-adjusting component receives the first polarized light beam emitted from the first light beam expander 61 or the second light beam expander 62 and then adjusts the width of the first polarized light beam emitted from the first light beam expander 61 or the second light beam expander 62, so that a light-emitting area of the first polarized light beam is controllable to meet different application requirements. In some embodiments of the present disclosure, the first width-adjusting component includes an optical system or optical component that is capable of increasing or reducing the width of the light beam. For example, the first width-adjusting component can be implemented by the optical component, such as, a lens system or a film-coated highly transmissive prism. FIG. 11 illustrates that the first width-adjusting component 34 receives the first polarized light sequentially emitted from the first dimmer 31, the second light beam expander 62, and the first optical-path adjusting component 33. It is exemplarily illustrated that the first width-adjusting component 34 shown in FIG. 11 sequentially receives the light emitted from the second light beam expander 62 and the light emitted from the first optical-path adjusting component 33. In some embodiments of the present disclosure, the first polarized light beam emitted from the second light beam expander 62 is first incident on the first width-adjusting component 34 to change a width of the emitted light, and then is incident on the first optical-path adjusting component 33 to change the propagating direction.

For example, as shown in FIG. 8, FIG. 9, FIG. 10, and FIG. 11, when the first direction h1 intersects the preset direction h0, the second direction h2 can be parallel to the preset direction h0.

For example, as shown in FIG. 8 and FIG. 9, the first light beam expander 61 is located on the optical path of the first polarized light emitted from the first dimmer 31 to prevent the first light beam expander 61 from receiving the second polarized light emitted from the birefringent component 21. As shown in FIG. 10 and FIG. 11, the second light beam expander 62 is located on the optical path of the first polarized light emitted from the first dimmer 31 to prevent the second light beam expander 62 from receiving the second polarized light emitted from the birefringent component 21.

In some embodiments of the present disclosure, as shown in FIG. 8, FIG. 9, FIG. 10, and FIG. 11, the backlight assembly includes a third light beam expander 63 located on the optical path of the second polarized light emitted from the birefringent component 21. The third light beam expander 63 is configured to expand the second polarized light beam emitted from the birefringent component 21. When a gap G3 is formed between the light beams propagating in the second direction h2 and emitted from the birefringent component 21, the embodiments of the disclosure provide third light beam expander 63 to increase the width of the second polarized light beam. As shown in FIG. 8, FIG. 9, FIG. 10, and FIG. 11, the extension line of at least one light of the light emitted from the third light beam expander 63 can pass through the gap G3 between two adjacent second polarized light beams, which is beneficial to making the first polarized light emitted from the backlight assembly more uniform. In some embodiments of the present disclosure, the third light beam expander 63 is located on the optical path of the second polarized light emitted from the birefringent component 21 to prevent the third light beam expander 63 from receiving the first polarized light emitted from the first dimmer 31.

For example, as shown in FIG. 8, FIG. 9, FIG. 10, and FIG. 11, the third light beam expander 63 can also be arranged in the same manner as the first light beam expander 61. For example, the third light beam expander 63 can include a divergence unit formed by a first convex lens, and a collimation unit formed by a second convex lens. In some embodiments of the present disclosure, the third light beam expander 63 may also have other structures capable of increasing the width of the second polarized light beam, which is not limited in the embodiments of the present disclosure.

In some embodiments of the present disclosure, as shown in FIG. 11, in some embodiments of the present disclosure, the backlight assembly can include a second optical-path adjusting component 32. The second optical-path adjusting component 32 is located on the optical path of the second polarized light emitted from the birefringent component 21. The second optical-path adjusting component 32 is configured to adjust the propagating direction of the second polarized light beam emitted from the birefringence component 21. When disposing the second optical-path adjusting component 32, the second optical-path adjusting component 32 is located on the optical path of the first polarized light emitted from the birefringent component 21, to prevent the second optical-path adjusting component 32 from receiving the first polarized light emitted from the first dimmer 31. When providing both the third light beam expander 63 and the second optical-path adjusting component 32, FIG. 11 exemplarily illustrates that the second optical-path adjusting component 32 is located on the optical path of the second polarized light emitted from the third light beam expander 63. In some embodiments of the present disclosure, the third light beam expander 63 can also be disposed on the optical path of the second polarized light emitted from the second optical-path adjusting component 32. That is, the second polarized light emitted from the birefringent component 21 first passes through the second optical-path adjusting component 32 to change its propagating direction, and then light beam expansion is performed on the second polarized light by the third light beam expander 63.

Similar to the arrangement of the first width-adjusting component 34, as shown in FIG. 11, some embodiments of the present disclosure can provide a second width-adjusting component 35 to adjust the width of the second polarized light beam emitted from the third light beam expander 63, so that the light-emitting area of the first polarized light beam is controllable to meet different application requirements. In some embodiments of the present disclosure, the second width-adjusting component 35 includes an optical system or an optical component capable of increasing or reducing the width of the light beam. For example, the second width-adjusting component 35 can be implemented by optical components such as a lens system or a film-coated highly transmissive prism.

FIG. 11 exemplarily illustrates that the second width-adjusting component 35 sequentially receives the light emitted from the third light beam expander 63 and the light emitted from the second optical-path adjusting component 32. In some embodiments of the present disclosure, the second polarized light beam emitted from the third light beam expander 63 is first incident on the second width-adjusting component 35 to change the width of the emitted light, and then is incident on the second optical-path adjusting component 32 to change its propagating direction.

Figure 12:
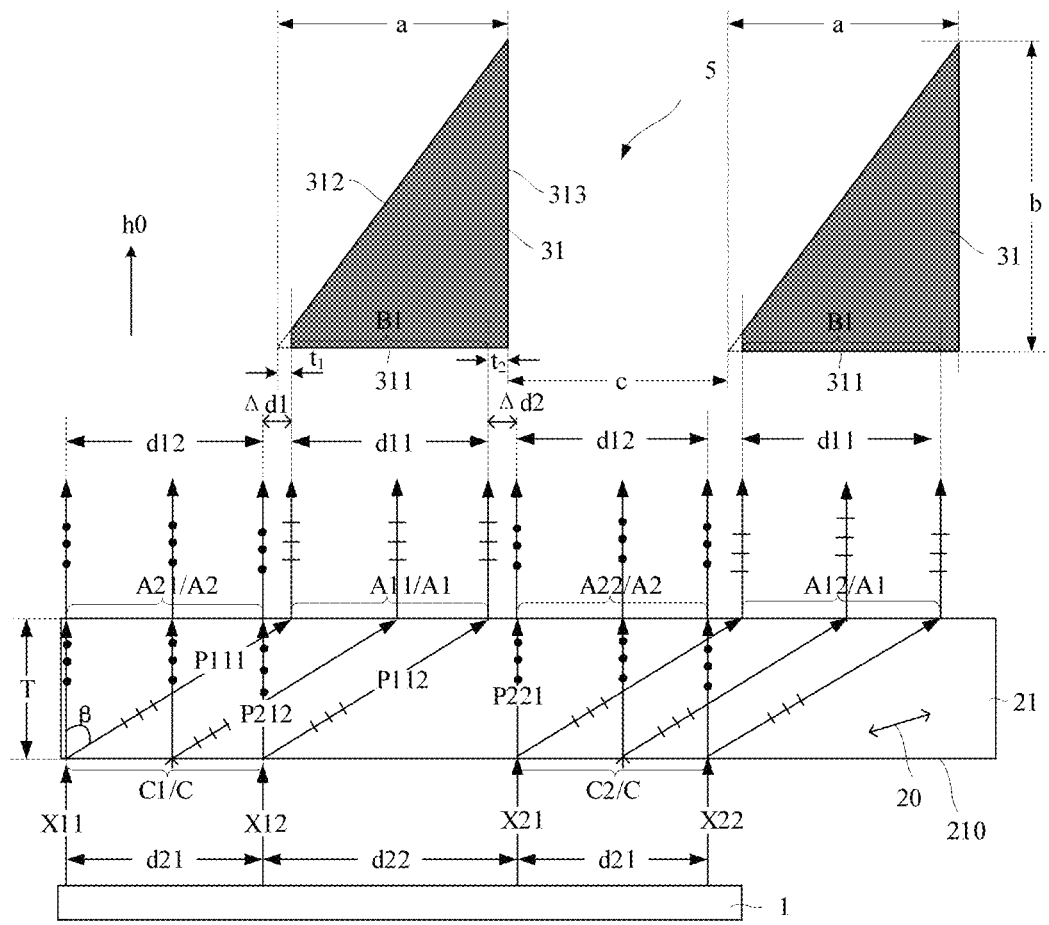
FIG. 12 is another schematic diagram of a backlight assembly and its optical path according to some embodiments of the present disclosure.

Referring to FIG. 4 again, when the first distance $t_1$ between the first boundary of the incident surface 311 of the first dimmer 31 and the second effective region B1 satisfies $t_1 > 0$, in addition to designing a sectional shape of the first dimmer 31 on the first section as a right triangle, in some embodiments of the present disclosure, the part, corresponding to the distance $t_1$, of the first dimmer 31 shown in FIG. 4 can be removed. That is, designing the sectional shape of the first dimmer 31 on the first section as a right-angled trapezoid shown in FIG. 12. FIG. 12 is another schematic diagram of a backlight assembly according to some embodiments of the present disclosure. A triangular pattern with a dotted outline in FIG. 12 illustrates the part, corresponding to the distance $t_1$, of the dimmer 31 shown in FIG. 4. In some embodiments of the present disclosure, without affecting the light emitted from the adjacent first dimmer 31, the part, corresponding to the distance t1, of the dimmer 31 shown in FIG. 4, can also have other shapes.

Figure 13:
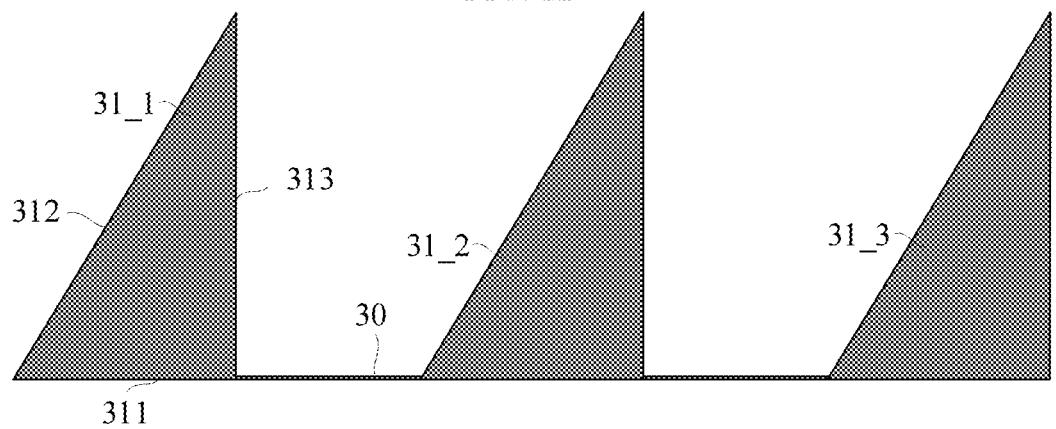
FIG. 13 is a schematic diagram of a first dimmer and a connection portion according to some embodiments of the present disclosure.

FIG. 13 is a schematic diagram of a first dimmer and a connection portion according to some embodiments of the present disclosure. In some embodiments of the present disclosure, as shown in FIG. 13, the backlight assembly includes a connection portion 30 configured to connect two adjacent first dimmer. FIG. 13 illustrates three first dimmers that are marked as 31_1, 31_2 and 31_3, respectively. For example, the connection portion 30 and the first dimmer 31 may be formed into one piece. With the connection portion 30, the overall strength of the multiple first dimmers 31 are increased, thereby avoiding deformation of the entirety including the multiple first dimmers 31.

For example, the birefringent component 21 includes a birefringent crystal or a liquid crystal layer. In some embodiments of the present disclosure, the liquid crystal layer includes an electrically controlled liquid crystal layer.

Figure 14:
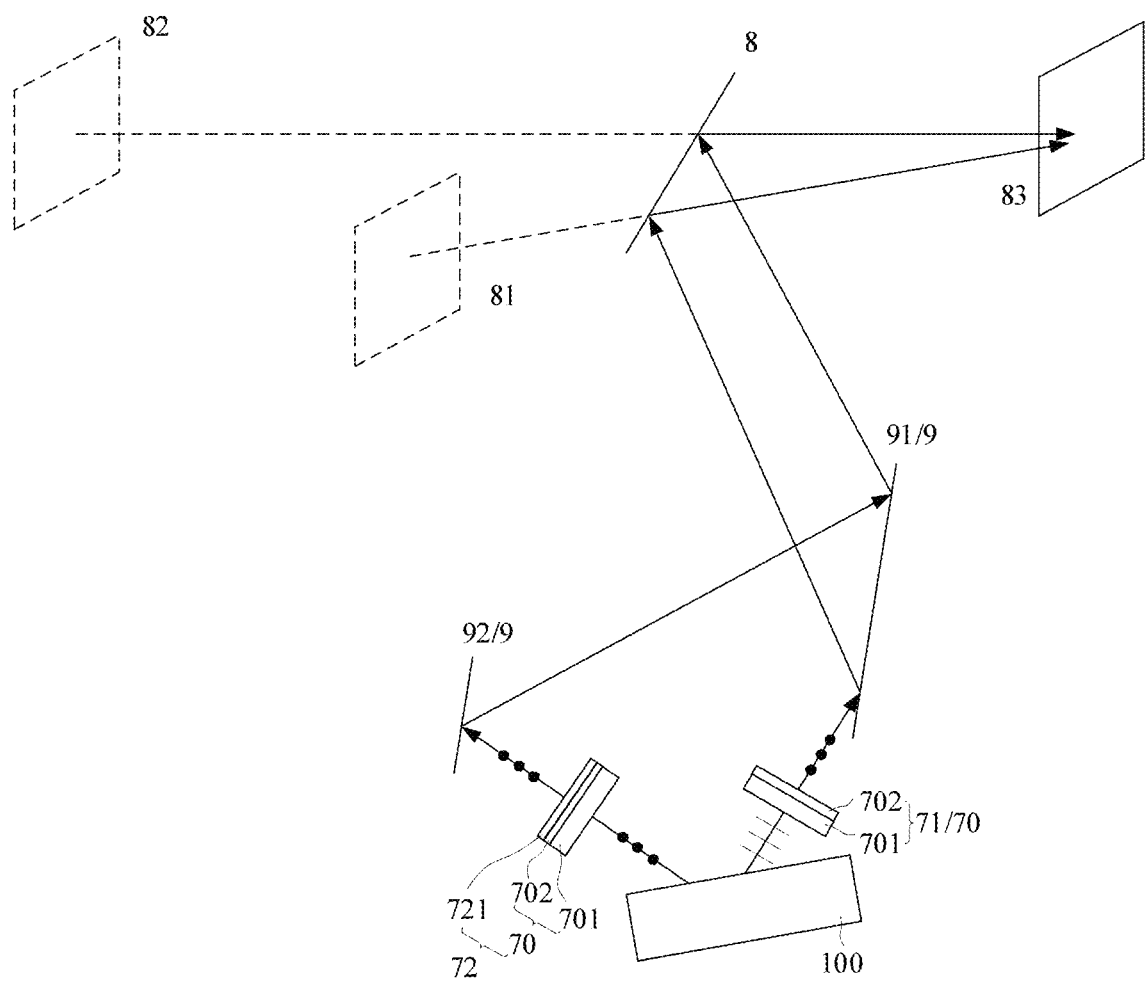
FIG. 14 is a schematic diagram of a head-up display system according to some embodiments of the present disclosure.

Some embodiments of the present disclosure provide a head-up display system (HUD). FIG. 14 is a schematic diagram of a head-up display system according to some embodiments of the present disclosure. As shown in FIG. 14, the head-up display system includes the backlight assembly 100, a first image source 71, and a second image source 72. The backlight assembly 100 is configured to emit a first backlight beam and a second backlight beam. A polarization direction of a light in the first backlight beam and a polarization direction of a light in the second backlight beam are perpendicular to each other. One of the first backlight beam and the second backlight beam corresponds to the first polarized light, and the other one of the first backlight beam and the second backlight beam corresponds to the second polarized light. In some embodiments of the present disclosure, the first backlight beam may correspond to the second polarized light, and the second backlight beam may correspond to the first polarized light.

The first image source 71 is located on an optical path of the first backlight beam emitted by the backlight assembly 100 and is configured to receive the first backlight beam emitted from the backlight assembly 100 and emit a first display light corresponding to display information, and the second image source 72 is located on an optical path of the second backlight beam emitted by the backlight assembly 100 and is configured to receive the second backlight beam emitted from the backlight assembly 100 and emit a second display light corresponding to the display information. For example, the displayed information includes the vehicle's current speed or navigation information.

As shown in FIG. 14, the head-up display system includes an optical element 8 located on both the optical path of the first display light and the optical path of the second display light, and is configured to receive and reflect the first display light to form a first virtual image 81, and to receive and reflect the second display light to form a second virtual image 82. In some embodiments of the present disclosure, the optical element 8 includes a reflective and transmissive element that can both transmit light and reflect light. The reflective and transmissive element includes a windshield of an automobile. As shown in FIG. 14, the first display light and the second display light can enter the eye box 83 after being reflected by the optical element 8. When the driver's eyes are within the scope of an eye box, the first virtual image 81 and the second virtual image 82 can be observed, so that the driver does not need to turn his head or lower his head to observe the instrument panel, and can directly look at the windshield to see information, such as, the vehicle speed and navigation. Since the optical element 8 can also transmit external light, the user can see the first virtual image 81 and the second virtual image 82 and an augmented reality effect superimposed by the external ambient light through the optical element 8. For example, as shown in FIG. 14, an imaging distance of the first virtual image 81 is different from an imaging distance of the second virtual image 82. In some embodiments of the present disclosure, the first virtual image 81 with a relatively small imaging distance can display vehicle speed information, and the second virtual image 82 with a relatively large imaging distance can display navigation information.

The head-up display system provided by the embodiments of the present disclosure, based on the backlight assembly 100, can enable the backlight assembly 100 to provide the backlight required for operation of the first image source 71 and the second image source 72, so that the first image source 71 utilizes the first backlight beam to emit the first display light for displaying the first virtual image, and the second image source 72 utilizes the second backlight beam to emit the second display light for displaying the second virtual image. The first backlight beam and the second backlight beam that respectively meet AR HUD two sets of optical path light sources can be used at the same time without providing two sets of backlight assemblies to respectively provide the backlight for the first image source 71 and the backlight for the second image source 72, which can reduce power consumption and generated heat.

For example, as shown in FIG. 14, the first image source 71 and the second image source 72 include a liquid crystal display screen 70. The liquid crystal display screen 70 includes a liquid crystal layer 701 and a first polarizer 702. The first polarizer 702 is located at a side of the liquid crystal layer 701 away from the backlight assembly 100.

In some embodiments of the present disclosure, a second polarizer may be disposed between the liquid crystal layer 701 and the backlight assembly 100, a transmission axis direction of the second polarizer corresponding to the first image source 71 is parallel to a polarization direction of a light in the first backlight beam received by the first image source 71, and a transmission axis direction of the second polarizer corresponding to the second image source 72 is parallel to a polarization direction of the light in the second backlight beam received by the second image source 72. In some embodiments of the present disclosure, no second polarizer is provided between the liquid crystal layer 701 and the backlight assembly 100. FIG. 14 illustrates that no second polarizer is provided between the liquid crystal layer 701 corresponding to the first image source 71 and the backlight assembly 100 and no second polarizer is provided between the liquid crystal layer 701 corresponding to the second image source 72 and the backlight assembly 100. Based on the configuration provided by the embodiments of the present disclosure, the light in the first backlight beam emitted by the backlight assembly 100 and incident on the first image source 71 and the light in the second backlight beam emitted by the backlight assembly 100 and incident on the second image source 72 have polarization characteristics, therefore, there is no need to set a second polarizer for polarization between the liquid crystal layer 701 and the backlight assembly 100, and only the first polarizer 702 for polarization analysis can be provided at the side of the liquid crystal layer 701 away from the backlight assembly 100, the first polarizer 702 is configured to analyze the polarized light modulated by the liquid crystal layer 701 to generate grayscales corresponding to different pixels, thereby generating a display image. Based on such configuration, both the first backlight beam and the second backlight beam emitted by the backlight assembly 100 can be efficiently utilized, thus avoiding the light energy loss caused by providing a polarizer for polarization.

For example, the transmission axis direction of the first polarizer 702 in the first image source 71 is perpendicular to the polarization direction of the light in the first backlight beam, and the transmission axis direction of the first polarizer 702 in the second image source 72 is perpendicular to the polarization direction of the light in the second backlight beam.

When the second backlight beam received by the second image source 72 includes a polarized light serving as an S light, in some embodiments, as shown in FIG. 14, the second image source 72 includes a first half-wave plate 721. In the second image source 72, the first half-wave plate 721 is located at the side of the first polarizer 702 away from the liquid crystal layer 701. With the first half-wave plate 721, the vibration direction of the light emitted from the first polarizer 702 of the second image source 72 can be adjusted so that the light emitted to the optical element 8 can be adjusted to be the S light. In some embodiments of the present disclosure, a second half-wave plate located at the side of the liquid crystal layer 701 adjacent to the backlight assembly 100 in the second image source 72 is provided. With the second half-wave plate, the vibration direction of the light in the second backlight beam received by the second image source 72 can be adjusted so that the light emitted through the first polarizer 702 of the second image source 72 is adjusted to be the S light. The S light has a higher reflectivity than a P light. Therefore, in the embodiments of the present disclosure, with the first half-wave plate 721 or the second half-wave plate, it is beneficial to improve the reflectivity of the optical element 8, thereby improving the intensity of light entering the eye box 83. When providing the second half-wave plate at the side of the liquid crystal layer 701 adjacent to the backlight assembly 100, the transmission axis direction of the first polarizer 702 is parallel to the polarization direction of the S light.

The above only takes the second backlight beam received by the second image source 72 including the polarized light serving as the S light an example to explain a configuration where the second image source 72 includes the first half-wave plate 721 or the second half-wave plate 721. When the first backlight beam received by the first image source 71 includes polarized light serving as S light, in some embodiments of the present disclosure, the first half-wave plate can be provided at a side of the first polarizer 702 away from the liquid crystal layer 701 in the first image source 71, so that the first half-wave plate is utilized to adjust the vibration direction of the light emitted from the first polarizer 702 of the first image source 71, and then the light emitted by the first image source 71 and incident on the optical element 8 is adjusted to the S light. Similarly, in some embodiments of the present disclosure, a second half-wave plate located at the side of the liquid crystal layer 701 adjacent to the backlight assembly 100 can also be provided in the first image source 71. With the second half-wave plate, the vibration direction of the light in the first backlight beam is adjusted so that the light emitted through the first polarizer 702 of the first image source 71 is adjusted to be the S light. With the first half-wave plate or the second half-wave plate in the first image source 71, it is beneficial to improving the reflectivity of the optical element 8, thereby increasing the intensity of the light entering the eye box 83. When the second half-wave plate located at the side of the liquid crystal layer 701 adjacent to the backlight assembly 100 is provided corresponding to the first image source 71, the transmission axis direction of the first polarizer 702 in the first image source 71 is parallel to the polarization direction of the S light.

For example, as shown in FIG. 14, the head-up display system includes multiple reflective components 9, and the reflective component 9 is configured to reflect the first display light to the optical element 8 and reflect the second display light to the optical element 8. Based on the configuration provided by the embodiments of the present disclosure, the two sets of optical paths. That is, the first backlight beam and the second backlight beam emitted by the backlight assembly 100, can share one set of reflective system including the reflective component 9, which is conducive to simplifying the structure of the head-up display system.

In some embodiments of the present disclosure, as shown in FIG. 14, when an angle between the light propagating direction of the first backlight beam received by the first image source 71 and the light propagating direction of the second backlight beam received by the second image source 72 is relatively large, the reflective component 9 can include a first reflector 91 and a second reflector 92. As shown in FIG. 14, the first reflector 91 is configured to receive the first display light emitted by the first image source 71 and reflect the first display light to the optical element 8, the second reflector 92 is configured to receive the second display light emitted by the second image source 72 and reflect the second display light to the first reflector 91, and the second display light is reflected by the first reflective mirror 91 to the optical element 8.

Figure 15:
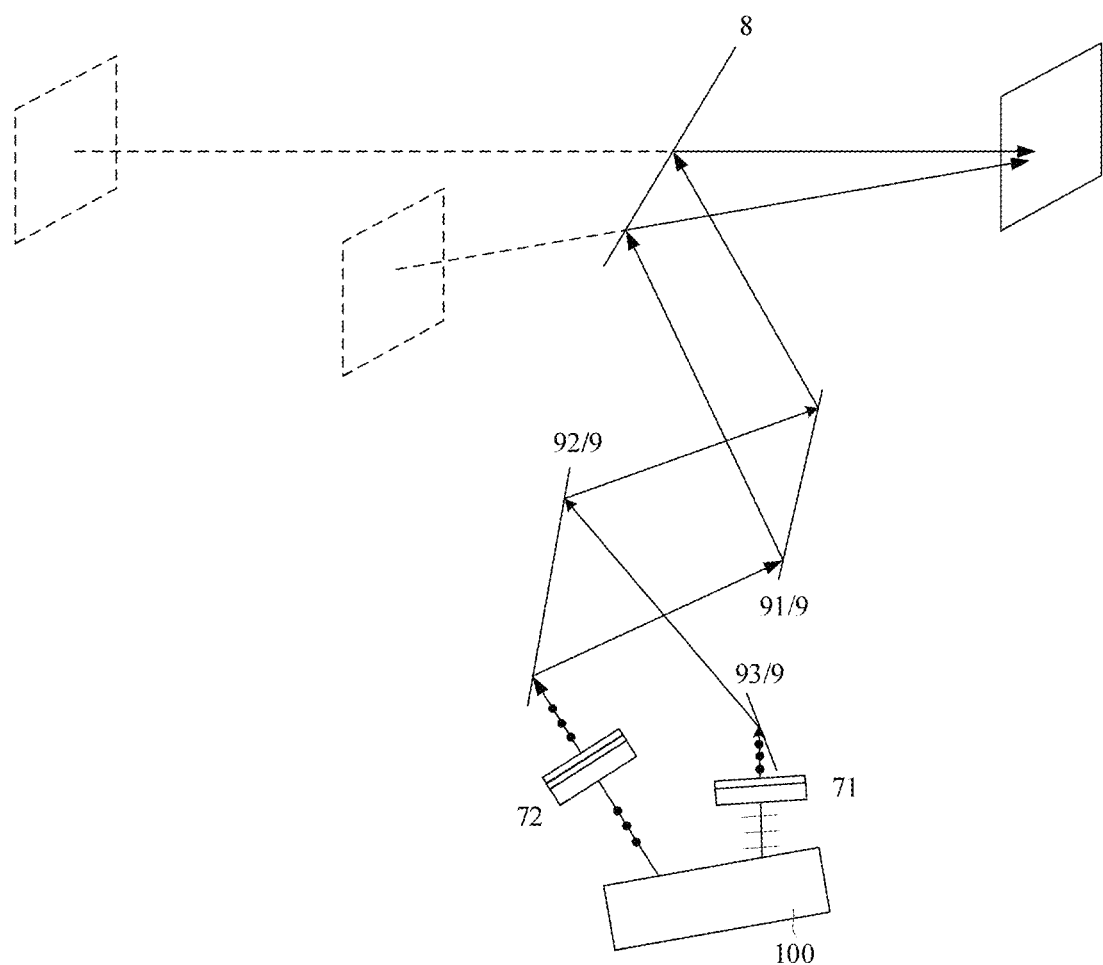
FIG. 15 is another schematic diagram of a head-up display system according to some embodiments of the present disclosure.

In other embodiments, as shown in FIG. 15, which is another schematic diagram of a head-up display system according to some embodiments of the present disclosure, when an angle between the light propagating direction of the first backlight beam received by the first image source 71 and the light propagating direction of the second backlight beam received by the second image source 72 is relatively small, the reflective component 9 can include a first reflector 91, a second reflector 92, and a third reflector 93. With reference to FIG. 15, the third reflector 93 is configured to receive the first display light emitted by the first image source 71 and reflect the first display light to the second reflector 92, the second reflector 92 can reflect the received first display light so that the reflected light is incident on the first reflector 91, and the first reflector 91 can reflect the received first display light to the optical element 8. The second reflector 92 can also receive the second display light emitted by the second image source 72 and reflect the second display light to the first reflector 91, and the first reflector 91 can reflect the received second display light to the optical component 8.

The structure, features, and effects of the present disclosure have been described in detail based on the embodiments shown in the drawings. The above descriptions are only exemplary embodiments of the present disclosure. However, the implementation scope of the present disclosure is not limited by the drawings. Any modifications made according to the concept of the present disclosure, or equivalent embodiments with equivalent modifications, shall fall within the scope of the present disclosure as long as they do not exceed the principle covered by the description and drawings.

What is claimed is:

1. A backlight assembly, comprising:
   a light source configured to emit light;
   a birefringent component located at a side of the light source, wherein the birefringent component is configured to divide the light incident on the birefringent component into a first polarized light and a second polarized light, a vibration direction of the first polarized light is different from a vibration direction of the second polarized light, the birefringent component comprises a first region and a second region, the first polarized light corresponds to the first region, the second polarized light corresponds to the second region, and the first region and the second region at least partially do not overlap in an emission direction of the light;
   at least one first dimmer located at a side of the birefringent component away from the light source, wherein the first polarized light propagates along a first direction after being emitted from the at least one first dimmer, the second polarized light propagates along a second direction, and the first direction intersects with the second direction;
   a first connection portion configured to connect two adjacent first dimmers; and/or
   a first optical-path adjusting component configured to adjust a propagating direction of a first polarized light beam emitted through the at least one first dimmer; and/or
   a second optical-path adjusting component configured to adjust a propagating direction of the second polarized light emitted from the birefringence component.

2. The backlight assembly according to claim 1, wherein the birefringent component comprises a first surface, the first surface comprises incident regions and is located at a side of the birefringent component adjacent to the light source;
   the light emitted by the light source are incident on the birefringent component through the incident regions;
   the backlight assembly comprises a first section parallel to an optical axis of the birefringent component and a normal of an incident surface of the birefringent component; and
   a length d21 of the incident region on the first section, a length d22 of an interval between two adjacent incident regions on the first section, a length T of the birefringent component along a direction perpendicular to the first surface, and an angle β between a light propagating direction of the first polarized light in the birefringent component and a light propagating direction of the second polarized light in the birefringent component satisfy: 0<d21≤T tan β≤d22.

3. The backlight assembly according to claim 2, wherein the first region and the second region do not overlap in the emission direction of the light; and wherein a length d11 of the first region on the first section and a length d12 of the second region on the first section satisfy: d11=d12.

4. The backlight assembly according to claim 2, further comprising a second dimmer located between the light source and the birefringent component, wherein the second dimmer is configured to adjust the light incident on the birefringent component to comprise incident light beams corresponding to the incident regions.

5. The backlight assembly according to claim 4, wherein the second dimmer comprises micro-lens groups, wherein one of the micro-lens groups comprises a convex lens and a concave lens, wherein the convex lens is located at a side of the concave lens away from the birefringent component, and the concave lens is arranged corresponding to the incident region; and wherein the concave lens comprises a first effective region, and two adjacent convex lenses of two micro-lens groups are in contact with each other, wherein a width d31 of the first effective region on the first section in a direction perpendicular to the propagating direction of the incident light, a width d41 of the convex lens on the first section in the width direction perpendicular to a propagating direction of incident light, and a distance d32 between two adjacent first effective regions satisfy: d41>d31=d21, and d32=d22.

6. The backlight assembly according to claim 2, wherein the at least one first dimmer comprises at least two first dimmers, wherein a length a of the incident surface of the at least one first dimmer on the first section and a distance c between two adjacent first dimmers satisfy: a≥d11>0 and c≥d12>0.

7. The backlight assembly according to claim 6, wherein the at least one first dimmer comprises a second surface and a third surface, the second surface and the third surface are perpendicular to the first section and are located at a side of the incident surface away from the birefringent component; and wherein an angle θ1 between the second surface and the incident surface satisfies 0<θ1<90°, and the third surface is perpendicular to the incident surface.

8. The backlight assembly according to claim 7, further comprising:

a first portion, wherein a part of the first portion is located at a side of the second surface away from the at least one first dimmer, and another part of the first portion is located at a side of the third surface away from the at least one first dimmer, and the first portion is in contact with the second surface and the third surface, and wherein a refractive index $n_1$ of the at least one first dimmer and a refractive index $n_2$ of the first portion satisfy $n_2<n_1$.

9. The backlight assembly according to claim 8, wherein sin $$\sin\theta_1 \geq \frac{n_2}{n_1}.$$

10. The backlight assembly according to claim 7, wherein the backlight assembly comprises a first section parallel to the optical axis of the birefringent component and the normal of an incident surface of the birefringent component; and wherein a length a of the incident surface on the first section and a length b of the third surface on the first section satisfy a<b.

11. The backlight assembly according to claim 10, wherein:

$$b \geq a\left(-X + \sqrt{X^2 + 1}\right), \text{ and}$$

$$X = -\sqrt{\frac{\left(\frac{a+c}{a-t_1}\right)^2 - \left(2 - \frac{n_1^2}{n_2^2}\right) - \sqrt{\left(\frac{a+c}{a-t_1}\right)^4 - \left(4 - 2\frac{n_1^2}{n_2^2}\right)\left(\frac{a+c}{a-t_1}\right)^2 + \left(3\frac{n_1^2}{n_2^2} - 2\right)^2}}{4 - 4\frac{n_1^2}{n_2^2}}},$$

where c represents a distance between two adjacent first dimmers, the incident surface of the at least one first dimmer comprises a second effective region, $t_1$ represents a distance between a first boundary of the incident surface and the second effective region.

12. The backlight assembly according to claim 11, further comprising:

a first beam expander configured to expand a first polarized light beam emitted through the third surface, wherein $$b > a\left(-X + \sqrt{X^2 + 1}\right);$$

and a first width-adjusting component, wherein the first width-adjusting component is configured to adjust a width of the first polarized light beam emitted through the third surface and the first beam expander sequentially, or, the first width-adjusting component is configured to adjust the width of the first polarized light beam emitted through only the third surface.

13. The backlight assembly according to claim 8, wherein:

$$\sin\theta_1 < \frac{n_2}{n_1}.$$

14. The backlight assembly according to claim 13, further comprising:

a second beam expander configured to expand a first polarized light beam emitted through the second surface; and a first width-adjusting component configured to adjust a width of the first polarized light beam emitted through the second surface and the second beam expander sequentially.

15. The backlight assembly according to claim 8, wherein the at least one first dimmer comprises a prism, and the first portion comprises air.

16. The backlight assembly according to claim 1, further comprising:
   a third beam expander configured to expand a second polarized light beam emitted from the birefringence component; and
   a second width-adjusting component configured to adjust a width of the second polarized light beam emitted through the third beam expander.

17. A head-up display system, comprising:
   a backlight assembly comprising:
   a light source configured to emit light;
   a birefringent component located at a side of the light source, wherein the birefringent component is configured to divide the light incident on the birefringent component into a first polarized light and a second polarized light, a vibration direction of the first polarized light is different from a vibration direction of the second polarized light, the birefringent component comprises a first region and a second region, the first polarized light corresponds to the first region, the second polarized light corresponds to the second region, and the first region and the second region at least partially do not overlap in an emission direction of the light; and
   at least one first dimmer located at a side of the birefringent component away from the light source, wherein the first polarized light propagates along a first direction after being emitted from the at least one first dimmer, the second polarized light propagates along a second direction, and the first direction intersects with the second direction,
   wherein the backlight assembly is configured to emit a first backlight beam and a second backlight beam, and a polarization direction of a light in the first backlight beam and a polarization direction of a light in the second backlight beam are perpendicular to each other, one of the first backlight beam and the second backlight beam corresponds to the first polarized light, and the other one of the first backlight beam and the second backlight beam corresponds to the second polarized light;
   a first image source configured to receive the first backlight beam and emit a first display light;
   a second image source configured to receive the second backlight beam and emit a second display light; and
   an optical element configured to receive and reflect the first display light to form a first virtual image, and configured to receive and reflect the second display light to form a second virtual image.

18. The head-up display system according to claim 17, wherein each of the first image source and the second image source comprises a liquid crystal display screen, wherein the liquid crystal display screen comprises a liquid crystal layer and a first polarizer, the first polarizer is located at a side of the liquid crystal layer away from the backlight assembly, and a second polarizer is provided between the liquid crystal layer and the backlight assembly, or no second polarizer is provided between the liquid crystal layer and the backlight assembly.

19. The head-up display system according to claim 18, wherein the second image source comprises a first half-wave plate located at a side of the first polarizer away from the liquid crystal layer, or the second image source comprises a second half-wave plate located at a side of the liquid crystal layer adjacent to the backlight assembly.

* * * * *